(12) United States Patent
Nonaka et al.

(10) Patent No.: US 12,552,142 B2
(45) Date of Patent: Feb. 17, 2026

(54) MULTILAYER STRUCTURE, MOLDED PRODUCT, AND METHOD FOR PRODUCING MOLDED PRODUCT

(71) Applicant: KURARAY CO., LTD., Okayama (JP)

(72) Inventors: Yasuhiro Nonaka, Kurashiki (JP); Tatsuya Oshita, Kurashiki (JP)

(73) Assignee: KURARAY CO., LTD., Okayama (JP)

( * ) Notice: Subject to any disclaimer, the term of this patent is extended or adjusted under 35 U.S.C. 154(b) by 912 days.

(21) Appl. No.: 17/762,950

(22) PCT Filed: Sep. 24, 2020

(86) PCT No.: PCT/JP2020/035897
§ 371 (c)(1),
(2) Date: Mar. 23, 2022

(87) PCT Pub. No.: WO2021/060309
PCT Pub. Date: Apr. 1, 2021

(65) Prior Publication Data
US 2022/0396060 A1 Dec. 15, 2022

(30) Foreign Application Priority Data
Sep. 24, 2019 (JP) .................................. 2019-173531

(51) Int. Cl.
| B32B 27/30 | (2006.01) |
| B32B 27/08 | (2006.01) |
| B32B 27/20 | (2006.01) |
| B32B 27/40 | (2006.01) |

(52) U.S. Cl.
CPC ............ *B32B 27/306* (2013.01); *B32B 27/08* (2013.01); *B32B 27/20* (2013.01); *B32B 27/40* (2013.01); *B32B 2307/4026* (2013.01); *B32B 2307/7242* (2013.01); *B32B 2307/732* (2013.01)

(58) Field of Classification Search
None
See application file for complete search history.

(56) References Cited

U.S. PATENT DOCUMENTS

| 2009/0308517 | A1* | 12/2009 | Nohara | B29D 30/0681 |
| | | | | 152/450 |
| 2015/0183270 | A1 | 7/2015 | Kitano et al. | |
| 2020/0087512 | A1* | 3/2020 | Chang | A43B 13/20 |
| 2020/0216658 | A1 | 7/2020 | Ito et al. | |

FOREIGN PATENT DOCUMENTS

| CN | 104507707 A | 4/2015 |
| CN | 109642058 A | 4/2019 |
| JP | 2004-322602 A | 11/2004 |

(Continued)

OTHER PUBLICATIONS

International Search Report issued in corresponding International Patent Application No. PCT/JP2020/035897 dated Dec. 1, 2020.

*Primary Examiner* — Jeffrey D Washville
(74) *Attorney, Agent, or Firm* — Morgan, Lewis & Bockius LLP

(57) ABSTRACT

The present disclosure provides a multilayer structure having a gas barrier layer and a polyurethane layer; a molded product having such a multilayer structure; and a method for producing the molded product.

21 Claims, 1 Drawing Sheet

(56) References Cited

FOREIGN PATENT DOCUMENTS

| | | |
|---|---|---|
| JP | 2006-272569 A | 10/2006 |
| JP | 2008-024228 A | 2/2008 |
| JP | 2008-202019 A | 9/2008 |
| JP | 2009-263653 A | 11/2009 |
| JP | 2011-105066 A | 6/2011 |
| JP | 2014-034647 A | 2/2014 |
| WO | 03/072653 A1 | 9/2003 |
| WO | 2011/068105 A1 | 6/2011 |
| WO | 2014/017486 A1 | 1/2014 |

* cited by examiner

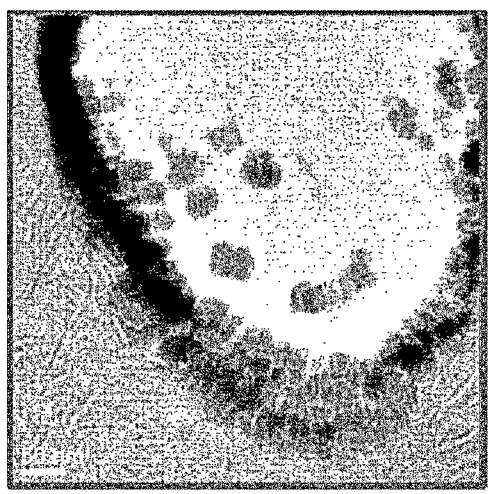

MULTILAYER STRUCTURE, MOLDED PRODUCT, AND METHOD FOR PRODUCING MOLDED PRODUCT

TECHNICAL FIELD

The present invention relates to a multilayer structure, a molded product, and a method for producing a molded product.

DISCUSSION OF THE BACKGROUND

Films obtained by using a resin, such as an ethylene-vinyl alcohol copolymer, having gas barrier properties find a wide range of applications such as packaging materials for foods, medical treatment, and the like. Recently, for the purpose of improving various types of performance such as the gas barrier properties, a variety of multilayer structures have been proposed in which a plurality of resin layers each having a thickness of micron order or submicron order are laminated.

As a conventional multilayer structure in which a plurality of resin layers of such an ethylene-vinyl alcohol copolymer are laminated, for example, Patent Document 1 discloses a multilayer structure including 8 or more layers in total of: a layer consisting of a resin composition containing a gas barrier resin such as an ethylene-vinyl alcohol copolymer or the like; and a layer consisting of a thermoplastic resin such as a thermoplastic polyurethane. This Patent Document 1 teaches that due to a metal salt being contained in either one of adjacent resin layers, a multilayer structure can be provided which is superior in interlayer adhesiveness, flexural resistance, and the like.

PRIOR ART DOCUMENTS

Patent Documents

Patent Document 1: PCT International Publication No. 2011/068105

SUMMARY OF THE INVENTION

Problems to be Solved by the Invention

The multilayer structure as described above may be employed for an intended usage in which exposure to an organic solvent such as methanol is conducted. Moreover, in cases in which the multilayer structure is to be colored, coloring may be carried out by subjecting the multilayer structure to immersion in an organic solvent containing a colorant. However, in the multilayer structure including 8 or more layers disclosed in Patent Document 1, delamination may occur in part upon exposure to an organic solvent. Thus, a multilayer structure has been demanded which is superior in delamination resistance even in cases of being exposed to an organic solvent while maintaining physical properties such as gas barrier properties and flexural resistance, due to the multilayer structure including 8 or more layers. It is to be noted that delamination which occurs in the case of being exposed to an organic solvent has been revealed to be a problem prominently found only in multilayer structures including a large total number of layers.

The present invention was made in view of the foregoing circumstances, and an object of the present invention is to provide: a multilayer structure which is superior in solvent resistance, with gas barrier properties and flexural resistance being maintained; a molded product having such a multilayer structure; and a method for producing the molded product.

Means for Solving the Problems

According to the present invention, the object described above is achieved by providing the following.

[1] A multilayer structure including:
a gas barrier layer (A) which contains an ethylene-vinyl alcohol copolymer (a1) and a thermoplastic resin (a2) having a functional group capable of reacting with the ethylene-vinyl alcohol copolymer (a1); and
a polyurethane layer (B) which contains a thermoplastic polyurethane (b),
wherein
a content of the thermoplastic resin (a2) with respect to 100 parts by mass in total of the ethylene-vinyl alcohol copolymer (a1) and the thermoplastic resin (a2) is 0.1 to 30 parts by mass,
the multilayer structure includes a constitution having at least one set of the gas barrier layer (A) and the polyurethane layer (B) being directly laminated to each other, and
a sum of numbers of the gas barrier layer (A) and the polyurethane layer (B) is 9 or more and 300 or less.

[2] The multilayer structure according to [1], wherein the functional group included in the thermoplastic resin (a2) is a carboxy group or a derivative thereof.

[3] The multilayer structure according to [1] or [2], wherein an acid value of the thermoplastic resin (a2) is 0.5 to 50 mg KOH/g.

[4] The multilayer structure according to any one of [1] to [3], wherein the thermoplastic resin (a2) is at least one selected from the group consisting of modified polyethylene, modified polypropylene, a modified ethylene-vinyl acetate copolymer, and a modified ethylene-ethyl acrylate copolymer.

[5] The multilayer structure according to any one of [1] to [4], wherein a content of an ethylene unit of the ethylene-vinyl alcohol copolymer (a1) is 20 mol % or more and 60 mol % or less.

[6] The multilayer structure according to any one of [1] to [5], wherein the gas barrier layer (A) further contains a higher fatty acid metal salt (a3).

[7] The multilayer structure according to any one of [1] to [6], wherein the gas barrier layer (A) and the polyurethane layer (B) are alternately laminated.

[8] The multilayer structure according to [7], wherein the polyurethane layer (B) includes: a polyurethane layer (B1) on which the gas barrier layer (A) is directly laminated on both faces; and a polyurethane layer (B2) on which the gas barrier layer (A) is directly laminated on only one face.

[9] The multilayer structure according to [8], including a protective layer (D) being directly laminated on the polyurethane layer (B2), wherein the protective layer (D) contains a thermoplastic polyurethane (x).

[10] The multilayer structure according to [9], wherein the protective layer (D) contains an ethylene-vinyl alcohol copolymer (y).

[11] The multilayer structure according to [9] to [10], wherein an average thickness per layer of the protective layer (D) is 300 μm or more and 800 μm or less.

[12] The multilayer structure according to any one of [1] to [11], wherein an outermost layer is the polyurethane layer (B).

[13] The multilayer structure according to any one of [1] to [12], wherein an average thickness per layer of the gas barrier layer (A) is 0.1 µm or more and 15 µm or less.

[14] The multilayer structure according to any one of [1] to [13], wherein an average thickness per layer of the polyurethane layer (B) is 0.1 µm or more and 30 µm or less.

[15] The multilayer structure according to any one of [1] to [14], wherein the gas barrier layer (A) forms a phase separation structure including a sea phase and an island phase, wherein the sea phase contains the ethylene-vinyl alcohol copolymer (a1), and the island phase contains the thermoplastic resin (a2).

[16] The multilayer structure according to [15], wherein an interior of the island phase further includes a phase containing the ethylene-vinyl alcohol copolymer (a1).

[17] A molded product which comprises the multilayer structure according to any one of [1] to [16], wherein at least one of the gas barrier layer (A) and the polyurethane layer (B) contains a colorant.

[18] A method for producing a molded product, the method including bringing the multilayer structure according to any one of [1] to [16] into contact with a treatment liquid containing an organic solvent.

[19] The method for producing a molded product according to [18], wherein the treatment liquid contains a colorant.

Effects of the Invention

According to the present invention, providing: a multilayer structure which is superior in solvent resistance, with gas barrier properties and flexural resistance being maintained; and a product having the multilayer structure is enabled.

BRIEF DESCRIPTION OF THE DRAWINGS

FIG. 1 is a TEM image of a cut-cross section of an "A layer" in a multilayer structure of Example 1.

DESCRIPTION OF EMBODIMENTS

Multilayer Structure

The multilayer structure of the present invention includes: a gas barrier layer (A) (hereinafter, may be abbreviated as "A layer") which contains an ethylene-vinyl alcohol copolymer (a1) (hereinafter, may be abbreviated as "EVOH (a1)") and a thermoplastic resin (a2) having a functional group capable of reacting with the EVOH (a1); and a polyurethane layer (B) (hereinafter, may be abbreviated as "B layer") which contains a thermoplastic polyurethane (b) (hereinafter, may be abbreviated as "TPU (b)"), wherein a content of the thermoplastic resin (a2) with respect to 100 parts by mass in total of the ethylene-vinyl alcohol copolymer (a1) and the thermoplastic resin (a2) is 0.1 to 30 parts by mass, the multilayer structure includes a constitution having at least one set of the gas barrier layer (A) and the polyurethane layer (B) being directly laminated to each other, and a sum of numbers of the gas barrier layer (A) and the polyurethane layer (B) is 9 or more and 300 or less. According to the present invention, due to: the multilayer structure including a constitution having at least one set of the A layer and the B layer being directly laminated to each other; the sum of numbers of the A layer and the B layer being 9 layers or more; and the A layer containing the thermoplastic resin (a2) in a specific amount, a multilayer structure can be obtained which is superior in solvent resistance and is superior in delamination resistance even in cases of being exposed to an organic solvent, while maintaining superior gas barrier properties and flexural resistance obtained due to the multilayer structure. It is to be noted that the "gas barrier properties" as referred to herein can be evaluated based on a measurement value of an oxygen transmission rate, and specifically can be evaluated in accordance with a method described in EXAMPLES.

The multilayer structure of the present invention may be constituted from only the A layer and the B layer, or may have an other resin layer aside from the A layer and the B layer. The multilayer structure of the present invention may further have a layer other than the resin layer. In light of maintaining gas barrier properties after flexion, the multilayer structure is preferably constituted from only the A layer and the B layer, but in the case of including the other resin layer, the other resin layer is preferably the outermost layer(s).

The multilayer structure of the present invention includes the constitution having at least one set of the A layer and the B layer being directly laminated to each other, the constitution preferably having at least four sets of the A layer and the B layer are directly laminated, and it is preferred that all layers of the A layer and the B layer constituting the multilayer structure are directly laminated on either the A layer or the B layer. When the multilayer structure has the constitution of direct lamination as described above, the effect of maintaining the gas barrier properties after flexion can be achieved. Moreover, in light of maintaining the gas barrier properties after flexion, the A layer and the B layer are preferably laminated alternately.

In light of enabling efficiently conducting coextrusion, the multilayer structure of the present invention preferably has a symmetrical structure (for example, B layer/A layer/B layer/A layer/B layer/A layer/B layer/A layer/B layer).

In the case in which the A layer and the B layer are alternately laminated, in light of further inhibiting deterioration of the gas barrier properties upon causing flexion, the B layer preferably includes: the polyurethane layer (B1) (hereinafter, may be abbreviated as "B1 layer") on which the A layer is directly laminated on both faces; and the polyurethane layer (B2) (hereinafter, may be abbreviated as "B2 layer") on which the gas barrier layer (A) is directly laminated on only one face. In other words, it is preferred that at least one of the outermost layers in the part in which the A layer and the B layer are alternately laminated is the B layer. The B layer as the at least one of the outermost layers in the part in which the A layer and the B layer are alternately laminated is the B2 layer, and the other B layer is the B1 layer. Furthermore, the B layer more preferably includes two of the B2 layer. In other words, it is further preferred that both of the outermost layers in the part in which the A layer and the B layer are alternately laminated are the B layer.

In the case of including the B2 layer, in light of further inhibiting deterioration of the gas barrier properties upon causing flexion, the multilayer structure of the present invention preferably contains the protective layer (D) (hereinafter, may be abbreviated to "D layer") being directly laminated on the B2 layer. The protective layer (D) is a layer which contains the thermoplastic polyurethane (x) (hereinafter, may be abbreviated as "TPU (x)"), and preferably contains the ethylene-vinyl alcohol copolymer (y) (hereinafter, may be abbreviated as "EVOH (y)"). The layer structure in the multilayer structure including the D layer is exemplified by D layer/B2 layer/A layer/B1 layer/A layer/B1 layer/A layer/B1 layer/A layer/B2 layer/D layer. It is preferred that the D layer is the outermost layer. The D layer may be provided on only one face side, but is preferably provided on both face sides. The multilayer structure of the present invention may be: a structure consisting of only the A layer and the B layer; a structure consisting of only the A layer, the B layer, and the D layer; or a structure further having another resin layer.

The number of the A layer constituting the multilayer structure of the present invention is preferably 4 or more, more preferably 6 or more, and still more preferably 8 or more. The number of the A layer being 4 or more is preferred due to enabling the gas barrier properties after flexion to be further maintained. On the other hand, the number of the A layer may be 150 or less.

The number of the B layer constituting the multilayer structure of the present invention is preferably 4 or more, more preferably 6 or more, and still more preferably 8 or more. The number of the B layer being 4 or more is preferred due to enabling the gas barrier properties after flexion to be further maintained. On the other hand, the number of the B layer may be 150 or less.

The sum of the numbers of the A layer and the B layer constituting the multilayer structure of the present invention is typically 9 or more, preferably 11 or more, still more preferably 15 or more, further preferably 25 or more, and particularly preferably 30 or more. On the other hand, the sum of the numbers of the A layer and the B layer is typically 300 or less, preferably 200 or less, and still more preferably 100 or less. The total number of layers in the multilayer structure preferably falls within the above range. When the multilayer structure has such a multilayer structure, even if a defect such as a pinhole or a crack with respect to flexion or the like occurs in a certain layer of the A layer, the gas barrier properties can be maintained with the other A layer(s), and as a result, enhancing characteristics such as the gas barrier properties, durability, and the like of the multilayer structure as a whole is enabled.

Furthermore, problems concerning solvent resistance, such as delamination that occurs when exposed to an organic solvent are unique problems which are significantly caused in the case of the conventional multilayer structure, which includes many layers. With regard to these problems, it is considered that in the case of including many layers, for example, influences from swelling of each layer due to the solvent are increased. In the multilayer structure in which the sum of the numbers of the A layer and the B layer is 9 or more, a benefit of superior solvent resistance can be enjoyed despite having such a multilayer structure, by, e.g., a certain amount of the thermoplastic resin (a2) being contained in the A layer.

An average thickness per layer of the A layer is preferably 0.1 μm or more, more preferably 0.2 μm or more, and still more preferably 0.3 μm or more. On the other hand, the average thickness per layer of the A layer is preferably 15 μm or less, more preferably 5 μm or less, still more preferably 3 μm or less, and particularly preferably 2 μm or less. When the average thickness per layer of the A layer is 0.1 μm or more, there is a tendency for forming the multilayer structure with uniform thickness to be comparatively easy, and for the gas barrier properties, the durability, the solvent resistance, and the like to be further improved. Conversely, when the average thickness per layer of the A layer is 15 μm or less, there is a tendency for flexibility and the like to improve, and as a result, also for the durability and the like to improve, whereas delamination upon exposure to an organic solvent tends to be less likely to occur.

An average thickness per layer of the B layer is preferably 0.1 μm or more, more preferably 0.5 μm or more, still more preferably 1 μm or more, and particularly preferably 3 μm or more. On the other hand, the average thickness per layer of the B layer is preferably 30 μm or less, more preferably 15 μm or less, still more preferably 10 μm or less, and particularly preferably 8 μm or less. When the average thickness per layer of the B layer is 0.1 μm or more, there is a tendency for forming the multilayer structure with uniform thickness to be comparatively easy, and for the durability, the solvent resistance, and the like to be further improved. Furthermore, it becomes easy for sufficient flexibility to be expressed. Conversely, when the average thickness per layer of the B layer is 30 μm or less, there is a tendency for the interlayer adhesiveness and/or the gas barrier properties to improve, whereas delamination upon exposure to an organic solvent tends to be less likely to occur.

An average thickness per layer of the B1 layer is preferably 0.1 μm or more, more preferably 0.5 μm or more, still more preferably 1 μm or more, and particularly preferably 3 μm or more. On the other hand, the average thickness per layer of the B1 layer is preferably 20 μm or less, more preferably 15 μm or less, still more preferably 10 μm or less, and particularly preferably 8 μm or less. When the average thickness per layer of the B1 layer is 0.1 μm or more, there is a tendency for forming the multilayer structure with uniform thickness to be comparatively easy, and for the durability to be further improved. Furthermore, it becomes easy for sufficient flexibility to be expressed. Conversely, when the average thickness per layer of the B1 layer is 20 μm or less, there is a tendency for the interlayer adhesiveness and the gas barrier properties to improve. Furthermore, in the case in which the average thickness per layer of the B1 layer is 20 μm or less, there is a tendency for the recyclability to be further improved. This is presumed to be, for example, because in carrying out melt kneading to recycle the trim and/or the like, the metal salt contained in the A layer as needed can be efficiently migrated to the entire polyurethane of the B1 layer. It is to be noted that "recyclability" as referred to herein means a property of ease in recycling, such as a small rotational torque fluctuation of an extruder screw, when a trim or the like of a multilayer structure is subjected to repeating melt molding for recycled use.

An average thickness per layer of the B2 layer is preferably 1 μm or more, and more preferably 3 μm or more. On the other hand, the average thickness per layer of the B2 layer is preferably 30 μm or less, more preferably 25 μm or less, and still more preferably 20 μm or less. When the average thickness per layer of the B2 layer is 1 μm or more, there is a tendency for the durability to be further improved. Furthermore, it becomes easy for sufficient flexibility to be expressed. Conversely, when the average thickness per layer of the B2 layer is 30 μm or less, there is a tendency for the interlayer adhesiveness and the gas barrier properties to improve. Furthermore, in the case in which the average thickness per layer of the B2 layer is 30 μm or less, there is a tendency for the recyclability to be further improved. This is presumed to be, for example, because in carrying out melt kneading to recycle the trim and/or the like, the metal salt contained in the A layer as needed can be efficiently migrated to the entire polyurethane of the B layer.

In the case in which the multilayer structure of the present invention includes the D layer, an average thickness per layer of the D layer is preferably 300 μm or more, more preferably 350 μm or more, and still more preferably 400 μm or more. On the other hand, the average thickness of the D layer is preferably 800 μm or less, more preferably 750 μm or less, and still more preferably 700 μm or less. When the average thickness of the D layer is 300 μm or more, there is a tendency for the durability to further improve. Furthermore, it becomes easy for sufficient flexibility to be expressed. Conversely, when the average thickness of the D layer is 800 µm or less, there is a tendency for the gas barrier properties after flexion to be improved.

A total thickness of all layers of the A layer and all layers of the B layer may, for example, be 5 µm or more, and is preferably 10 µm or more, more preferably 15 µm or more, and still more preferably 30 µm or more. On the other hand, the total thickness of all layers of the A layer and all layers of the B layer is preferably 500 µm or less, more preferably 300 µm or less, and still more preferably 100 µm or less. In the case in which the total thickness of all layers of the A layer and all layers of the B layer is 10 µm or more, there is a tendency for the flexural resistance, the durability, the gas barrier properties, the solvent resistance, and the like to improve. Conversely, in the case in which the total thickness is 500 µm or less, the flexibility, moldability, and the like can be improved, whereby improvement of the flexural resistance and/or reduction of the production cost can be achieved. In addition, the recyclability may be improved by, e.g., optimization of the resin amount in the B layer. Herein, the "total thickness of all layers" means the sum of the average thicknesses of each layer. In the multilayer structure of only the A layer and the B layer, the overall thickness of the multilayer structure of the A layer and the B layer can be the total thickness. The average thickness of each layer is an average value of thicknesses of cross-sections at 10 sites selected arbitrarily.

A ratio of the average thickness per layer of the A layer to the average thickness per layer of the B layer (A layer/B layer) may be, for example, 0.05 or more, but is preferably 0.1 or more, more preferably 0.15 or more, and still more preferably 0.2 or more, or 0.25 or more. Furthermore, the ratio is preferably 1 or less, more preferably 0.8 or less, and still more preferably 0.6 or less. When the ratio of the average thickness per layer of the A layer to the average thickness per layer of the B layer (A/B) is 0.1 or more, there is a tendency for deterioration of the gas barrier properties to be inhibited due to fractures of the A layer arising from stress during flexion being reduced, and the solvent resistance may be improved. Furthermore, when the ratio (A/B) is 1 or less, there is a tendency for fractures of the A layer to be reduced due to stress during flexion being inhibited by the B layer, whereby deterioration of the gas barrier properties is inhibited, and the solvent resistance tends to be improved. Moreover, in the case in which the ratio of the average thickness per layer of the A layer to the average thickness per layer of the B layer falls within the above range, there is a tendency for proportions of the resins of the A layer and the B layer to be suitable throughout the multilayer structure as a whole, whereby recyclability and/or the like is/are improved.

The average thickness of the multilayer structure of the present invention as a whole is not particularly limited, and a suitable average thickness can be adopted in accordance with an intended purpose, functionality, and the like. For example, when the thickness is comparatively thin, a reduction in weight and the like can be achieved, whereas when the thickness is comparatively thick, the gas barrier properties and the like can be further improved. The lower limit of the average thickness of the multilayer structure of the present invention as a whole may be, for example, 5 µm, 10 µm, 15 µm, 30 µm, 100 µm, or 300 µm. On the other hand, the upper limit may be 3 mm, 1 mm, 500 µm, 300 µm, or 100 µm.

The interlayer adhesive force between the A layer and the B layer of the multilayer structure of the present invention is preferably 300 g/15 mm or more, more preferably 400 g/15 mm or more, and still more preferably 500 g/15 mm or more. Furthermore, the interlayer adhesive force of the multilayer structure of the present invention may be 1,500 g/15 mm or less. When the interlayer adhesive force is 300 g/15 mm or more, there is a tendency for delamination upon flexion, etc., to be inhibited. Means of improving the interlayer adhesive force of the multilayer structure of the present invention may be exemplified by methods such as: adjusting an addition amount and/or an acid value of the thermoplastic resin (a2); directly laminating the A layer and the B layer; alternately laminating the A layer and the B layer; and the like. The interlayer adhesive force of the multilayer structure of the present invention can be measured by a method disclosed in EXAMPLES.

An oxygen transmission rate (OTR) of the multilayer structure of the present invention measured at 20° C. and 65% RH is preferably 20 mL/($m^2$·day·atm) or less, more preferably 15 mL/($m^2$·day·atm) or less, and still more preferably 10 mL/($m^2$·day·atm) or less. Furthermore, the OTR may be 0.2 mL/($m^2$·day·atm) or more. When the oxygen transmission rate of the multilayer structure of the present invention falls within the above range, the multilayer structure can be suitably used as a material for which gas barrier properties, durability, and the like are required. Furthermore, the OTR after flexion, described in EXAMPLES, of the multilayer structure of the present invention is preferably 60 mL/($m^2$·day·atm) or less, and more preferably 20 mL/($m^2$·day·atm) or less. Moreover, the OTR after flexion may be 0.3 mL/($m^2$·day·atm) or more. When the OTR after flexion of the multilayer structure of the present invention falls within the above range, the multilayer structure can be suitably used as a material for which elasticity is required. The OTR and the OTR after flexion of the multilayer structure of the present invention may be measured by methods described in EXAMPLES.

A Layer

The A layer is a layer containing the EVOH (a1) and the thermoplastic resin (a2) having a functional group capable of reacting with the EVOH (a1). In the A layer, a content of the thermoplastic resin (a2) with respect to 100 parts by mass in total of the EVOH (a1) and the thermoplastic resin (a2) is 0.1 to 30 parts by mass. Due to containing the specific amount of the EVOH (a1) and the thermoplastic resin (a2), the A layer enables obtaining a multilayer structure which is superior in the gas barrier properties and the solvent resistance. Although not necessarily clarified and without wishing to be bound by any theory, the reason for the solvent resistance of the multilayer structure of the present invention being superior is presumed to be, for example, that due to the presence a certain amount of the thermoplastic resin (a2) having a functional group capable of reacting with the EVOH (a1), swelling of the A layer in a case of being exposed to a solvent is inhibited, whereby high adhesiveness between the A layer and the B layer is maintained.

The sum of contents of the EVOH (a1) and the thermoplastic resin (a2) in the A layer is preferably 60% by mass or more, more preferably 80% by mass or more, still more preferably 90% by mass or more, even more preferably 95% by mass or more, and yet more preferably 99% by mass or more, or may be 100% by mass. Furthermore, the sum of contents of the EVOH (a1) and the thermoplastic resin (a2) in the entire resin component in the A layer is preferably 60% by mass or more, more preferably 80% by mass or more, still more preferably 90% by mass or more, even more preferably 95% by mass or more, and yet more preferably 99% by mass or more, or may be 100% by mass.

A degree of swelling of the A layer, when immersed in 1-propanol/water=60/40 (mass ratio), at 40° C., for 30 min is preferably 50% by mass or less, more preferably 40% by mass or less, and still more preferably 30% by mass or less. Also, the degree of swelling of the A layer may be 10% by mass or more. The degree of swelling of the A layer falling within the above range approximates to the degree of swelling of the B layer, thereby leading to a tendency for inhibition of delamination of the multilayer structure to be enabled even in the case of being exposed to an organic solvent, such as immersion in the organic solvent. Means of adjusting the degree of swelling of the A layer to be low may be exemplified by means such as: increasing the addition amount of the thermoplastic resin (a2); and/or strongly kneading with the EVOH (a1). It is to be noted that the degree of swelling of the A layer can be measured by a method disclosed in EXAMPLES.

EVOH (a1)

The EVOH (a1) is a polymer having an ethylene unit and a vinyl alcohol unit as principal structural units. It is to be noted that the EVOH (a1) may also include one type or a plurality of types of other structural units in addition to the ethylene unit and the vinyl alcohol unit. The EVOH (a1) is typically obtained by polymerizing ethylene with a vinyl ester, and saponifying a thus resulting ethylene-vinyl ester copolymer.

An ethylene unit content (specifically, a ratio of the number of ethylene units to the total number of monomers in the EVOH (a1)) of the EVOH (a1) is preferably 20 mol % or more, more preferably 25 mol % or more, and still more preferably 30 mol % or more. On the other hand, the ethylene unit content of the EVOH (a1) is preferably 60 mol % or less, and more preferably 55 mol % or less. When the ethylene unit content of the EVOH (a1) is 20 mol % or more, the gas barrier properties, melt molding properties, the solvent resistance, and the like of the multilayer structure obtained under high humidity are further improved. Conversely, when the ethylene unit content of the EVOH (a1) is 60 mol % or less, the gas barrier properties of the multilayer structure obtained are further improved.

A degree of saponification (specifically, a proportion of the number of vinyl alcohol units to the total number of vinyl alcohol units and vinyl ester units in the EVOH (a1)) of the EVOH (a1) is preferably 80 mol % or more, more preferably 95 mol % or more, and particularly preferably 99 mol % or more. On the other hand, the degree of saponification of the EVOH (a1) is preferably 99.99 mol % or less. When the degree of saponification of the EVOH (a1) is 80 mol % or more, there is a tendency for the melt molding properties to improve, and in addition, there are also cases in which the gas barrier properties of the multilayer structure obtained improve, and resistance to coloring and moisture resistance also improve. Conversely, in the case in which the degree of saponification of the EVOH (a1) is 99.99 mol % or less, gas barrier properties and the like can be exhibited while inhibiting an increase in production cost of the EVOH (a1). The EVOH (a1) may be used alone, but an embodiment involving use after blending the EVOH having the degree of saponification exceeding 99 mol % with another EVOH is also suitable.

The EVOH (a1) preferably has at least one of a structural unit (I) represented by the following formula (I), a structural unit (II) represented by the following formula (II), and a structural unit (III) represented by the following formula (III). When the EVOH (a1) has such a structural unit, the flexural resistance and the like of the multilayer structure obtained can be further improved.

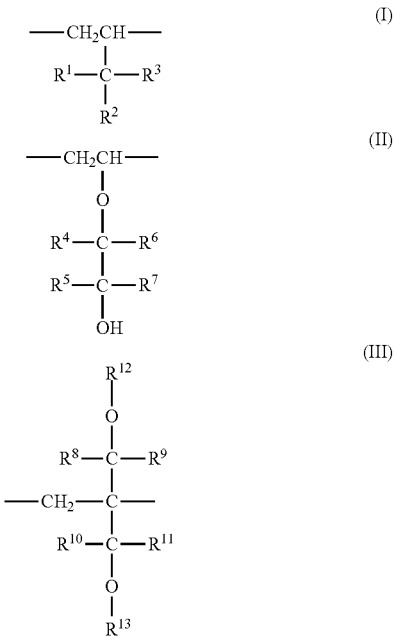

In the above formula (I), $R^1$, $R^2$, and $R^3$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms, or a hydroxyl group. Furthermore, a pair from $R^1$, $R^2$, and $R^3$ may be bonded. Moreover, a part or all of hydrogen atoms contained in the aliphatic hydrocarbon group having 1 to 10 carbon atoms, the alicyclic hydrocarbon group having 3 to 10 carbon atoms, and the aromatic hydrocarbon group having 6 to 10 carbon atoms may be substituted with a hydroxyl group, a carboxy group, or a halogen atom.

In the above formula (II), $R^4$, $R^5$, $R^6$, and $R^7$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms, or a hydroxyl group. Furthermore, $R^4$ and $R^5$, or $R^6$ and $R^7$ may be bonded. Moreover, a part or all of hydrogen atoms contained in the aliphatic hydrocarbon group having 1 to 10 carbon atoms, the alicyclic hydrocarbon group having 3 to 10 carbon atoms, and the aromatic hydrocarbon group having 6 to 10 carbon atoms may be substituted with a hydroxyl group, an alkoxy group, a carboxy group, or a halogen atom.

In the above formula (III), $R^8$, $R^9$, $R^{10}$, and $R^{11}$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms, or a hydroxyl group. Moreover, a part or all of hydrogen atoms contained in the aliphatic hydrocarbon group having 1 to 10 carbon atoms, the alicyclic hydrocarbon group having 3 to 10 carbon atoms, and the aromatic hydrocarbon group having 6 to 10 carbon atoms may be substituted with a hydroxyl group, an alkoxy group, a carboxy group, or a halogen atom. $R^{12}$ and $R^{13}$ each independently represent a hydrogen atom, a formyl group, or an alkanoyl group having 2 to 10 carbon atoms.

A content of the structural unit (I), (II), or (III) with respect to total structural units is preferably 0.5 mol % or more, more preferably 1 mol % or more, and still more preferably 1.5 mol % or more. On the other hand, the content of the structural unit (I), (II), or (III) is preferably 30 mol % or less, more preferably 15 mol % or less, and still more preferably 10 mol % or less. Due to the EVOH (a1) having the structural unit represented by the above formula (I), (II), or (III) in a proportion falling within the above range, the material which forms the A layer exhibits improved flexibility and improved processing characteristics, and consequently, the stretchability, thermoformability, and the like of the multilayer structure obtained can be improved.

In the structural unit (I), (II) or (III), the aliphatic hydrocarbon group having 1 to 10 carbon atoms is exemplified by an alkyl group, an alkenyl group, and the like, the alicyclic hydrocarbon group having 3 to 10 carbon atoms is exemplified by a cycloalkyl group, a cycloalkenyl group, and the like, and the aromatic hydrocarbon group having 6 to 10 carbon atoms is exemplified by a phenyl group and the like.

In the structural unit (I), it is preferred that $R^1$, $R^2$ and $R^3$ each independently represent a hydrogen atom, a methyl group, an ethyl group, a hydroxyl group, a hydroxymethyl group, or a hydroxyethyl group, and in particular, it is more preferred that $R^1$, $R^2$ and $R^3$ each independently represent a hydrogen atom, a methyl group, a hydroxyl group, or a hydroxymethyl group. When $R^1$, $R^2$ and $R^3$ are as described above, the stretchability and thermoformability of the multilayer structure obtained can be further improved.

A method for allowing the EVOH (a) to include the structural unit (I) is not particularly limited. For example, a method may be employed in which a monomer from which the structural unit (I) is derived is copolymerized in the polymerization of ethylene with a vinyl ester. Examples of the monomer from which the structural unit (I) is derived include: alkenes such as propylene, butylene, pentene, and hexene; and alkenes having a hydroxyl group and/or an ester group such as 3-hydroxy-1-propene, 3-acyloxy-1-propene, 3-acyloxy-1-butene, 4-acyloxy-1-butene, 3,4-diacyloxy-1-butene, 3-acyloxy-4-hydroxy-1-butene, 4-acyloxy-3-hydroxy-1-butene, 3-acyloxy-4-methyl-1-butene, 4-acyloxy-2-methyl-1-butene, 4-acyloxy-3-methyl-1-butene, 3,4-diacyloxy-2-methyl-1-butene, 4-hydroxy-1-pentene, 5-hydroxy-1-pentene, 4,5-dihydroxy-1-pentene, 4-acyloxy-1-pentene, 5-acyloxy-1-pentene, 4,5-diacyloxy-1-pentene, 4-hydroxy-3-methyl-1-pentene, 5-hydroxy-3-methyl-1-pentene, 4,5-dihydroxy-3-methyl-1-pentene, 5,6-dihydroxy-1-hexene, 4-hydroxy-1-hexene, 5-hydroxy-1-hexene, 6-hydroxy-1-hexene, 4-acyloxy-1-hexene, 5-acyloxy-1-hexene, 6-acyloxy-1-hexene, and 5,6-diacyloxy-1-hexene. In particular, propylene, 3-acetoxy-1-propene, 3-acetoxy-1-butene, 4-acetoxy-1-butene, and 3,4-diacetoxy-1-butene are preferred in light of reactivity in copolymerization and the gas barrier properties of the multilayer structure obtained. In the case of the alkene having an ester, the structural unit (I) is derived during the saponification reaction.

In the above structural unit (II), it is preferred that $R^4$ and $R^5$ both represent a hydrogen atom. In particular, it is more preferred that $R^4$ and $R^5$ both represent a hydrogen atom, one of $R^6$ and $R^7$ represents an aliphatic hydrocarbon group having 1 to 10 carbon atoms, and the other of $R^6$ and $R^7$ represents a hydrogen atom. The aliphatic hydrocarbon group is preferably an alkyl group or an alkenyl group. In light of particular importance of the gas barrier properties of the multilayer structure obtained, it is particularly preferred that one of $R^6$ and $R^7$ represents a methyl group or an ethyl group, and the other of $R^6$ and $R^7$ represents a hydrogen atom. Alternatively, it is also particularly preferred that one of $R^6$ and $R^7$ represents a substituent represented by $(CH_2)_hOH$ (where h is an integer of 1 to 8), and the other of $R^6$ and $R^7$ represents a hydrogen atom. In the substituent represented by $(CH_2)_hOH$, h is preferably an integer of 1 to 4, more preferably 1 or 2, and particularly preferably 1.

The method for allowing the EVOH (a1) to include the structural unit (II) is not particularly limited. For example, a method may be employed in which EVOH obtained by a saponification reaction is allowed to react with a monovalent epoxy compound such that the structural unit (II) is included in the EVOH. As the monovalent epoxy compound, a compound represented by one of the following formulae (IV) to (X) is suitably used.

(IV)

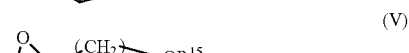
(V)

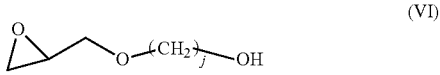
(VI)

(VII)

(VIII)

(IX)

(X)

In the above formulae (IV) to (X), $R^{14}$, $R^{15}$, $R^{16}$, $R^{17}$ and $R^{18}$ each independently represent a hydrogen atom, an aliphatic hydrocarbon group (such as an alkyl group or an alkenyl group) having 1 to 10 carbon atoms, an alicyclic hydrocarbon group (such as a cycloalkyl group or a cycloalkenyl group) having 3 to 10 carbon atoms, or an aliphatic hydrocarbon group (such as a phenyl group) having 6 to 10 carbon atoms; and i, j, k, p, and q are each independently an integer of 1 to 8.

Examples of the monovalent epoxy compound represented by the above formula (IV) include epoxyethane (ethylene oxide), epoxypropane, 1,2-epoxybutane, 2,3-epoxybutane, 3-methyl-1,2-epoxybutane, 1,2-epoxypentane, 3-methyl-1,2-epoxypentane, 1,2-epoxyhexane, 2,3-epoxyhexane, 3,4-epoxyhexane, 3-methyl-1,2-epoxyhexane, 3-methyl-1,2-epoxyheptane, 4-methyl-1,2-epoxyheptane, 1,2-epoxyoctane, 2,3-epoxyoctane, 1,2-epoxynonane, 2,3-epoxynonane, 1,2-epoxydecane, 1,2-epoxydodecane, epoxyethylbenzene, 1-phenyl-1,2-epoxypropane, 3-phenyl-1,2-epoxypropane, and the like. Examples of the monovalent epoxy compound represented by the above formula (V) include various types of alkyl glycidyl ethers. Examples of the monovalent epoxy compound represented by the above formula (VI) include various types of alkylene glycol monoglycidyl ethers. Examples of the monovalent epoxy compound represented by the above formula (VII) include various types of alkenyl glycidyl ethers. Examples of the monovalent epoxy compound represented by the above formula (VIII) include various types of epoxyalkanols such as glycidol. Examples of the monovalent epoxy compound represented by the above formula (IX) include various types of epoxycycloalkanes. Examples of the monovalent epoxy compound represented by the above formula (X) include various types of epoxycycloalkenes.

Of the monovalent epoxy compounds described above, epoxy compounds having 2 to 8 carbon atoms are preferred. In particular, the monovalent epoxy compound more preferably has 2 to 6 atoms, and still more preferably has 2 to 4 carbon atoms, in light of ease in handling the compound and in light of reactivity. Of the monovalent epoxy compounds represented by the above formulae, the compound represented by the formula (IV) and the compound represented by the formula (V) are particularly preferred. Specifically, in light of reactivity with EVOH (a1) and the gas barrier properties of the multilayer structure obtained, 1,2-epoxybutane, 2,3-epoxybutane, epoxypropane, epoxyethane, and glycidol are preferred, and of these, epoxypropane and glycidol are particularly preferred.

In the structural unit (III), $R^8$, $R^9$, $R^{10}$ and $R^{11}$ each preferably represent a hydrogen atom or an aliphatic hydrocarbon group having 1 to 5 carbon atoms. In particular, the aliphatic hydrocarbon group is preferably a methyl group, an ethyl group, an n-propyl group, an isopropyl group, an n-butyl group, an isobutyl group, a tert-butyl group, or a pentyl group.

The method for allowing the EVOH (a1) to include the structural unit (III) is not particularly limited, and for example, the EVOH (a1) including the structural unit (III) may be produced by using the method described in Japanese Unexamined Patent Application, Publication No. 2014-034647.

Thermoplastic Resin (a2)

The thermoplastic resin (a2) is a thermoplastic resin having a functional group capable of reacting with the EVOH (a1). The functional group is preferably a group capable of reacting with a hydroxyl group of the EVOH (a1). Specific examples of the functional group include a carboxy group or a derivative thereof, a phosphoric acid group or a derivative thereof, an epoxy group, an amino group, halogens, and the like. Examples of the derivative of a carboxy group include a carboxylic anhydride group (—CO—O—CO—), a carboxylic acid chloride group (—COCl, —COBr, and the like), and the like. Of these, a carboxy group, a phosphoric acid group, or a derivative or the like thereof, or an acidic group is preferred, and a carboxy group or a derivative thereof is more preferred. It is to be noted that the acidic group may be present in the form of a salt.

The thermoplastic resin (a2) which can be suitably used is a modified thermoplastic resin which contains a carboxy group, obtained by allowing an ethylenic unsaturated carboxylic acid or an anhydride thereof to chemically bond (for example, by addition reaction, graft reaction, copolymerization, or the like) to a thermoplastic resin. As the thermoplastic resin into which the functional group (modified group) is introduced, an olefin-derived polymer is suitably used. As the olefin-derived polymer, a polyolefin such as polyethylene, polypropylene, or polybutene, a copolymer (for example, an ethylene-vinyl acetate copolymer, an ethylene-ethyl acrylate copolymer, SEBS (a hydrogenation product of a block copolymer of styrene and butadiene), or the like) of an olefin with another monomer (a vinyl ester, an unsaturated carboxylic acid ester, styrene, or the like), or the like may be used. Of these, polyethylene, polypropylene, the ethylene-vinyl acetate copolymer (having a content of vinyl acetate being 5 to 55% by mass), and the ethylene-ethyl acrylate copolymer (having a content of ethyl acrylate being 8 to 35% by mass) are preferred, polyethylene, polypropylene, and the ethylene-vinyl acetate copolymer are more preferred, and polyethylene and polypropylene are particularly preferred.

The ethylenic unsaturated carboxylic acid or an anhydride thereof is exemplified by: an ethylenic unsaturated monocarboxylic acid, or an ester thereof; an ethylenic unsaturated dicarboxylic acid, or a monoester or a diester thereof; or an anhydride of the same. Of these, the ethylenic unsaturated dicarboxylic anhydride is preferred. Specific examples include maleic acid, fumaric acid, itaconic acid, maleic anhydride, itaconic anhydride, a maleic acid monomethyl ester, a maleic acid monoethyl ester, a maleic acid diethyl ester, a fumaric acid monomethyl ester, and the like, and maleic anhydride is particularly suitable.

Accordingly, the thermoplastic resin (a2) is preferably a modified olefin-derived polymer, and more preferably modified polyethylene, modified polypropylene, a modified ethylene-vinyl acetate copolymer, or a modified ethylene-ethyl copolymer acrylate. Alternatively, a modified polyolefin is also preferred, and a modified polyethylene and a modified polypropylene are more preferred. Each of the modified olefin-derived polymer, the modified polyolefin, the modified polyethylene, the modified polypropylene, the modified ethylene-vinyl acetate copolymer, and the modified ethylene-ethyl copolymer acrylate is preferably an acid-modified product, and more preferably a carboxylic acid-modified product. These thermoplastic resins (a2) may be used either alone, or two or more types thereof may be used as a mixture.

The thermoplastic resin (a2) is preferably a resin having a 100% modulus at −30° C. of 6 MPa or more. When the 100% modulus at −30° C. of the thermoplastic resin (a2) is less than 6 MPa, the solvent resistance or the like may be affected.

The amount of addition or the amount of grafting (degree of modification) of a functional group (modified group) to the thermoplastic resin is, with respect to an unmodified thermoplastic resin thereof, 0.0001 to 15% by mass, and preferably 0.001 to 10% by mass. An addition reaction or a grafting reaction of the functional group (modified group) to the thermoplastic resin can be conducted by, for example, a radical polymerization procedure in the presence of a solvent (such as xylene), and a catalyst (such as peroxide), or the like.

The lower limit of a melt flow rate (MFR) of the thermoplastic resin (a2), measured at 190° C. under a load of 2,160 g is preferably 0.2 g/10 min, more preferably 0.5 g/10 min, and still more preferably 1.5 g/10 min. On the other hand, the upper limit of the MFR is preferably 1,100 g/10 min, more preferably 900 g/10 min, and still more preferably 800 g/10 min. When the MFR of the thermoplastic resin (a2) falls within the above range, due to, e.g., the dispersibility becoming more favorable, there is a tendency for the gas barrier properties, the interlayer adhesiveness, the recyclability, the solvent resistance, and the like to be more favorable.

The acid value of the thermoplastic resin (a2) is preferably 0.5 mg KOH/g or more, more preferably 5 mg KOH/g or more, and still more preferably 15 mg KOH/g or more. The acid value of the thermoplastic resin (a2) is preferably 100 mg KOH/g or less, more preferably 50 mg KOH/g or less, and still more preferably 40 mg KOH/g or less. When the acid value of the thermoplastic resin (a2) is 0.5 mg KOH/g or more, due to a decrease in the degree of swelling of the A layer, there is a tendency for the solvent resistance (delamination resistance) to improve. Furthermore, when the acid value of the thermoplastic resin (a2) is 100 mg KOH/g or less, the dispersibility of the thermoplastic resin improves, whereby there is a tendency for the interlayer adhesive force, the recyclability, and the like to improve. It is to be noted that the acid value of the thermoplastic resin (a2) may be determined in accordance with JIS K 0070 (1992).

A content of the thermoplastic resin (a2) in the A layer, with respect to 100 parts by mass of the total of the EVOH (a1) and the thermoplastic resin (a2), is typically 0.1 parts by mass or more, preferably 1 part by mass or more, and more preferably 3 parts by mass or more. Furthermore, the content of the thermoplastic resin (a2) with respect to 100 parts by mass of the total of the EVOH (a1) and the thermoplastic resin (a2) is typically 30 parts by mass or less, preferably 20 parts by mass or less, and more preferably 15 parts by mass or less. When the content of the thermoplastic resin (a2) is less than 0.1 parts by mass, the solvent resistance may be inferior, whereby there is a tendency for the delamination resistance upon an exposure to an organic solvent to be insufficient. Furthermore, when the content of the thermoplastic resin (a2) is more than 30 parts by mass, the external appearance and/or the gas barrier properties of the multilayer structure of the present invention may deteriorate, and in subjecting the trim and/or the like of the multilayer structure of the present invention to repeated melt molding for recycled use, there is a tendency for a rotational torque fluctuation of the screw of an extruder to increase.

The A layer preferably forms a phase separation structure having a sea phase and an island phase, and it is preferred that the sea phase contains the EVOH (a1), and the island phase contains the thermoplastic resin (a2).

In the case in which the A layer forms the phase separation structure having the sea-island structure, a dispersed particle diameter in the island phase is preferably 1 µm or less, more preferably less than 0.5 µm, and still more preferably less than 0.4 µm or less than 0.3 µm. The dispersed particle diameter in the island phase may be 0.1 µm or more. Means of adjusting the dispersed particle diameter may be exemplified by methods of adjusting the acid value of the thermoplastic resin (a2), and the like, for example. Furthermore, it is preferred that an interior of the island phase further includes a phase containing the EVOH (a1), and it is more preferred that the EVOH (a1) is dispersed in a scattering manner. In the case in which the island phase further includes the phase containing the EVOH (a1), the dispersed particle diameter thereof is preferably 0.5 µm or less and more preferably less than 0.3 µm, and may be 0.005 µm or more. Means of adjusting the dispersed particle diameter in the phase containing the EVOH (a1) may be exemplified by methods of adjusting conditions of film formation for the multilayer structure, and the like, for example. When the phase containing the EVOH (a1) is formed in the interior of the island phase containing the thermoplastic resin (a2), recyclability of the A layer can be improved.

Higher Fatty Acid Metal Salt (a3)

It is preferred that the A layer contains the higher fatty acid metal salt (a3). A content of the higher fatty acid metal salt (a3) in the A layer, in terms of metal atoms, is preferably 10 ppm or more and 300 ppm or less. As referred to herein, the "higher fatty acid" means a fatty acid having 10 or more carbon atoms. Furthermore, as referred to herein, "ppm" means a percentage content on mass basis. The A layer containing the higher fatty acid metal salt (a3) is preferred since, in subjecting the trim and/or the like to repeated melt molding for recycled use, inhibiting deterioration of hue, and reducing the amount of adhesion to a screw in the melt molder, of the resin deteriorated, are enabled. It is to be noted that when the amount of the resin deteriorated which adheres to a screw in the melt molder is low, molding can be stably carried out for a long period of time, with less rotational torque fluctuation.

The metal atom constituting the higher fatty acid metal salt (a3) may be alone of one type, or may consist of a plurality of types of metals. The metal atom is preferably a divalent metal atom. Of these, the metal atom is preferably at least one selected from the group consisting of atoms of magnesium, manganese, tin, cobalt, zinc, cadmium, lead, and titanium, and is more preferably at least one selected from the group consisting of magnesium, cobalt, tin, and titanium. Of these, a magnesium or cobalt atom is preferably contained. Due to containing the metal atom, there is a tendency for the A layer and the B layer to exhibit greater adhesiveness. Although not necessarily clarified and without wishing to be bound by any theory, the reason for exhibiting greater adhesiveness is presumed to be, for example, that there the compound containing the metal atom tends to promote a transesterification reaction, and the reaction can contribute to an improvement in adhesiveness.

The lower limit of the number of carbon atoms in the higher fatty acid constituting the higher fatty acid metal salt (a3) is preferably 12, more preferably 13, and still more preferably 14, 15, 16, 17, or 18. Furthermore, the upper limit of the number of carbon atoms is 30, may be 24, may be 22, or may be 20. Examples of the higher fatty acid constituting the higher fatty acid metal salt (a3) include stearic acid, ricinoleic acid, myristic acid, lauric acid, and the like, and of these, stearic acid is preferred. Including the higher fatty acid is preferable due to a tendency to enable inhibiting deterioration of the hue.

As the higher fatty acid metal salt (a3), for example, magnesium stearate, cobalt stearate, and the like can be suitably used.

A content of the higher fatty acid metal salt (a3) in terms of metal atoms is preferably 10 ppm or more, more preferably 20 ppm or more, and still more preferably 30 ppm or more. Furthermore, the content of the higher fatty acid metal salt (a3) in terms of metal atoms is preferably 300 ppm or less, more preferably 200 ppm or less, and still more preferably 100 ppm or less. When the content of the higher fatty acid metal salt (a3) is 10 ppm or more, there is a tendency for the interlayer adhesive force, the recyclability, and the like to improve. Furthermore, when the content of the higher fatty acid metal salt (a3) in terms of metal atoms is 300 ppm or less, there is a tendency to enable inhibiting deterioration of the hue, and for the recyclability to improve.

To the A layer may be added, within a range not leading to impairment of the effects of the present invention, one or a plurality of types of additives such as a phosphoric acid compound, a carboxylic acid compound, a boron compound, a metal salt other than the higher fatty acid metal salt (a3), and the like. When these additives are added to the EVOH (a1) or the like constituting the A layer, various types of performance of the multilayer structure obtained can be improved.

Examples of the phosphoric acid compound which may be used include various acids such as phosphoric acid and phosphorous acid and salts thereof. A phosphate may be contained, for example, in any form of a primary phosphate, a secondary phosphate, or a tertiary phosphate. A cation species of the phosphate is not particularly limited, either, and an alkali metal ion or an alkaline earth metal ion is preferred. Of these, addition of the phosphoric acid compound such as sodium dihydrogenphosphate, potassium dihydrogenphosphate, disodium hydrogenphosphate, or dipotassium hydrogenphosphate is preferred. In the case in which the A layer contains the phosphoric acid compound, a content thereof in terms of phosphate radical equivalent is preferably 1 to 500 ppm. When the A layer contains the phosphoric acid compound, there is a tendency for the long-run workability to improve in the case of long-time film formation of the A layer.

The carboxylic acid compound which may be contained in the A layer is exemplified by a carboxylic acid, as well as a carboxylic acid ion, or may be a carboxylic acid derivative. Furthermore, the carboxylic acid may be a monocarboxylic acid, a polyvalent carboxylic acid having two or more carboxy groups within its molecule, or a combination thereof. It is to be noted that a polymer is not included in the polyvalent carboxylic acid. Furthermore, the polyvalent carboxylic acid ion is derived from the polyvalent carboxylic acid by eliminating at least one hydrogen ion of the carboxy group. The carboxy group of the carboxylic acid may be esterified, or the carboxylic acid ion may form a salt with a metal. The carboxylic acid compound preferably has 10 carbon atoms or fewer.

The monocarboxylic acid is not particularly limited, and examples thereof include formic acid, acetic acid, propionic acid, butyric acid, caproic acid, capric acid, acrylic acid, methacrylic acid, benzoic acid, 2-naphthoic acid, and the like. These carboxylic acids may have a hydroxyl group and/or a halogen atom. In addition, the carboxylic acid ion is exemplified by those derived from each of the carboxylic acids by eliminating a hydrogen ion of its carboxyl group. The pKa of the monocarboxylic acid (also including the monocarboxylic acid that gives the monocarboxylic acid ion) is, in light of adjustability of the pH of the composition and melt formability, preferably 3.5 or greater, and more preferably 4 or greater. Examples of such a monocarboxylic acid include formic acid (pKa=3.68), acetic acid (pKa=4.74), propionic acid (pKa=4.85), butyric acid (pKa=4.80), and the like. In light of easy handling and the like, acetic acid is preferred.

Moreover, the multivalent carboxylic acid is not particularly limited as long as two or more carboxyl groups are included within its molecule, and examples thereof include: aliphatic dicarboxylic acids such as oxalic acid, malonic acid, succinic acid, maleic acid, fumaric acid, glutaric acid, adipic acid, and pimelic acid; aromatic dicarboxylic acids such as phthalic acid, isophthalic acid, and terephthalic acid; tricarboxylic acids such as aconitic acid; carboxylic acid having 4 or more carboxyl groups such as 1,2,3,4-butanetetracarboxylic acid and ethylenediaminetetraacetic acid; hydroxycarboxylic acids such as tartaric acid, citric acid, isocitric acid, malic acid, mucic acid, tartronic acid, and citramalic acid; ketocarboxylic acids such as oxaloacetic acid, mesoxalic acid, 2-ketoglutaric acid, and 3-ketoglutaric acid; amino acids such as glutamic acid, aspartic acid, and 2-aminoadipic acid; and the like. It is to be noted that examples of the multivalent carboxylic acid ion include anions of these multivalent carboxylic acids. Of these, succinic acid, malic acid, tartaric acid, and citric acid are particularly preferred in light of favorable availability.

In the case in which the A layer contains the carboxylic acid compound, in light of coloring resistance in melt molding, a content thereof in terms of carboxylic acid radical equivalent is preferably 0.5 μmol/g to 20 μmol/g.

Examples of the boron compound include boric acids, boric acid esters, boric acid salts, hydrogenated borons, and the like. Specific examples of the boric acids include orthoboric acid (hereinafter, merely referred to also as "boric acid"), metaboric acid, tetraboric acid, and the like. Specific examples of the boric acid esters include triethyl borate, trimethyl borate, and the like. Specific examples of the boric acid salts include alkali metal salts, alkaline earth metal salts of the aforementioned various types of boric acids, borax, and the like. Of these compounds, orthoboric acid is preferred.

In the case in which the A layer contains the boron compound, in light of favorable film-forming stability of the A layer, a content thereof is preferably 20 to 2,000 ppm in terms of boron element equivalent.

The metal salt other than the higher fatty acid metal salt (a3) is exemplified by a lower fatty acid metal salt having fewer than 10 carbon atoms, a metal salt of an organic acid other than a fatty acid, a metal salt of an inorganic acid, and the like. A metal used in the metal salt is preferably an alkali metal or an alkaline earth metal. Examples of the alkali metal include lithium, sodium, potassium, and the like. The alkali metal salt is exemplified by lower aliphatic carboxylates, aromatic carboxylates, phosphates, metal complexes, and the like of alkali metals. Examples of the alkali metal salt include sodium acetate, potassium acetate, sodium phosphate, potassium phosphate, a sodium salt of ethylenediamine tetraacetic acid, and the like. Of these, sodium acetate, potassium acetate, sodium phosphate, and potassium phosphate are suitable. In the case in which the A layer contains the alkaline earth metal salt other than the higher fatty acid metal salt (a3), in light of improving the interlayer adhesiveness, a content thereof is preferably 20 to 1,000 ppm in terms of metal atoms. Examples of the alkaline earth metal include beryllium, magnesium, calcium, strontium, barium, and the like, and in light of industrial availability, magnesium or calcium is more preferred. The alkaline earth metal salt is exemplified by lower aliphatic carboxylates, aromatic carboxylates, phosphates, metal complexes, and the like of alkali earth metals. Examples of the alkaline earth metal salt include magnesium acetate, calcium acetate, magnesium phosphate, calcium phosphate, and the like, and of these, magnesium acetate and calcium acetate are suitable. In the case in which the A layer contains the alkali earth metal salt other than the higher fatty acid metal salt (a3), a content thereof is preferably 20 to 1,000 ppm in terms of metal atoms. When the alkali earth metal salt is included in the above range, there is a tendency for more superior adhesiveness between the A layer and the B layer to be exhibited. Furthermore, deterioration of the EVOH in repeatedly recycling the multilayer structure is inhibited, and the external appearance of the molded product is improved due to a reduction in defects such as gels and hard spots.

The A layer may contain an other resin in addition to the EVOH (a1) and the thermoplastic resin (a2) within a range not leading to impairment of the effects of the present invention. Examples of the other resin include polyethylene, polypropylene, an ethylene-propylene copolymer, an ethylene or propylene copolymer (a copolymer of ethylene or propylene, and at least one of the following monomers: an α-olefin such as 1-butene, isobutene, 4-methyl-1-pentene, 1-hexene, and 1-octene; vinylpyrrolidone; etc.), polyolefins such as poly 4-methyl-1-pentene and poly 1-butene; polyesters such as polyethylene terephthalate, polybutylene terephthalate, and polyethylene naphthalate; vinylidene polychloride, vinyl polychloride, polystyrene, polycarbonate, and polyacrylate; and the like.

Furthermore, the A layer may contain, in addition to the other resin, a variety of components such as a heat stabilizer, an ultraviolet ray absorbing agent, an antioxidant, a colorant, a filler, a plasticizer, a photoinitiator, a deodorant, an antistatic agent, a lubricant, a desiccant, a filling agent, a pigment, a dye, a processing aid, a flame retardant, an anti-fogging agent, and the like.

B Layer

The B layer is a polyurethane layer containing the TPU (b). Due to having the B layer containing the TPU (b), the multilayer structure of the present invention enables achieving favorable stretchability, flexural resistance, heat formability, and the like. A degree of swelling of the B layer, when immersed in 1-propanol/water=60/40% by mass, at 40° C., for 30 min is preferably 30% by mass or less, more preferably 25% by mass or less, and still more preferably 20% by mass or less. Furthermore, the degree of swelling of the B layer may be 5% by mass or more. When the degree of swelling of the B layer falls within the above range, the degree of swelling of the B layer approximates to the degree of swelling of the A layer, thereby leading to a tendency for inhibition of delamination of the multilayer structure to be enabled even in the case of immersion in the organic solvent. It is to be noted that the degree of swelling of the B layer may be measured by the method described in EXAMPLES. Furthermore, a difference in the degree of swelling between the A layer and the B layer is preferably 35% by mass or less, more preferably 30% by mass or less, still more preferably 20% by mass or less, and particularly preferably 15% by mass or less. When the difference in the degree of swelling falls within the above range, there is a tendency for inhibition of delamination of the multilayer structure to be further enabled in the case of immersion in the organic solvent.

The B layer containing the TPU (b) is preferable due to enabling improving the stretchability, the heat moldability, and the like. Furthermore, owing to, for example, the strong adhesiveness between the B layer and the A layer, the multilayer structure of the present invention is capable of exhibiting favorable flexural resistance and the like.

A content of the TPU (b) in the B layer is preferably 60% by mass or more, more preferably 80% by mass or more, still more preferably 90% by mass or more, even more preferably 95% by mass or more, may be yet further preferably 99% by mass or more, and may be 100% by mass.

The TPU (b) is constituted from a high-molecular weight polyol, an organic polyisocyanate, a chain extender, and the like. The TPU (b) is typically, for example, a linear multiblock copolymer that includes: (1) a hard segment obtained by a reaction of a short chain glycol (low-molecular weight polyol) with an isocyanate, and (2) a soft segment obtained by a reaction of a long chain glycol (high-molecular weight polyol) with an isocyanate.

The high-molecular weight polyol is a substance having a plurality of hydroxyl groups, and may be obtained by polycondensation, addition polymerization (e.g., ring-opening polymerization), polyaddition, or the like. The high-molecular weight polyol is exemplified by a polyester polyol, a polyether polyol, a polycarbonate polyol, condensates thereof (e.g., a polyester-ether-polyol), and the like. The high-molecular weight polyol may be used either alone, or as a mixture of two or more types thereof. Of these, a polyester polyol and a polycarbonate polyol are preferred, and a polyester polyol is particularly preferred.

The polyester polyol may be produced, for example, according to a conventional method, by allowing an ester-formable derivative such as a dicarboxylic acid, an ester thereof, or an anhydride thereof to be condensed with a low-molecular weight polyol by way of a direct esterification reaction or a transesterification reaction, or by subjecting a lactone to ring-opening polymerization.

Examples of the polyether polyol include polyethylene glycol, polypropylene glycol, polytetramethylene glycol, poly(methyltetramethylene) glycol, and the like. The polyether polyol may be used either alone, or as a mixture of two or more types thereof. Of these, polytetramethylene glycol is preferred.

As the polycarbonate polyol, for example, a substance obtained through condensation polymerization by allowing an aliphatic diol having 2 to 12 carbon atoms such as 1,4-butanediol, 1,5-pentanediol, 1,6-hexanediol, 1,8-octanediol, or 1,10-decanediol, or a mixture of these to react with diphenyl carbonate, phosgene, or the like may be suitably used.

The lower limit of the number average molecular weight of the high-molecular weight polyol is preferably 500, more preferably 600, and still more preferably 700. The upper limit of the number average molecular weight of the high-molecular weight polyol is preferably 8,000, more preferably 5,000, and still more preferably 3,000. When the number average molecular weight of the high-molecular weight polyol is equal to or greater than the lower limit, resilience of TPU resulting from appropriate miscibility with the organic polyisocyanate improves, whereby there is a tendency for mechanical characteristics such as stretchability and thermoformability of the multilayer structure obtained to improve. Conversely, when the number average molecular weight of the high-molecular weight polyol is equal to or less than the upper limit, miscibility with the organic polyisocyanate improves, whereby mixing in the polymerization procedure becomes easier. As a result, it may be easier to obtain stable TPU due to inhibiting generation of blocks of gelatinous matter, and the like. It is to be noted that the number average molecular weight of the high-molecular weight polyol is determined by a measurement in accordance with JIS K 1577 and calculated based on the hydroxyl value.

The organic polyisocyanate is not particularly limited, and a well-known organic diisocyanate commonly employed in the production of TPU may be used. Examples of the organic diisocyanate include: aromatic diisocyanates such as 4,4'-diphenylmethanediisocyanate, tolylenediisocyanate, phenylenediisocyanate, xylylenediisocyanate, 1,5-naphthylenediisocyanate, 3,3'-dichloro-4,4'-diphenylmethanediisocyanate, and toluylenediisocyanate; aliphatic diisocyanates (inclusive of alicyclic diisocyanates) such as hexamethylenediisocyanate, isophoronediisocyanate, 4,4'-dicyclohexylmethanediisocyanate, and hydrogenated xylylenediisocyanate; and the like. Among these, 4,4'-diphenylmethanediisocyanate is preferred in light of the advantage that the strength and flexural resistance of the multilayer structure obtained can be improved. The organic diisocyanate may be used either alone, or in a combination of two or more types thereof.

As the chain extender, any chain extender commonly employed in the production of TPU may be used, and a low-molecular weight compound having two or more active hydrogen atoms that can react with an isocyanate group in the molecule and having a molecular weight of 300 or less is suitably used. Examples of the chain extender include ethylene glycol, propylene glycol, 1,4-butanediol, 1,6-hexanediol, 1,4-bis(β-hydroxyethoxy)benzene, 1,4-cyclohexanediol, and the like. Among these, an aliphatic diol having 2 to 10 carbon atoms is preferred, and 1,4-butanediol is particularly preferred, in light of the advantage that the stretchability and thermoformability of the multilayer structure obtained can be more favorable. The chain extender may be used either alone, or as a mixture of two or more types thereof.

As for the method for producing the TPU (b), the high-molecular weight polyol, the organic polyisocyanate, and the chain extender described above are used and a well-known urethanating reaction technique is employed. Either the prepolymer method or the one-shot method may be used for the production. Specifically, melt polymerization conducted substantially in the absence of a solvent is preferred, and continuous melt polymerization conducted through the use of a multi-screw extruder is particularly preferred.

The B layer may be constituted from only the TPU (b), or may contain an other resin aside from the TPU (b). Furthermore, the B layer may further contain another component aside from the other resin such as a heat stabilizer, an ultraviolet ray absorbing agent, an antioxidant, a colorant, an antistatic agent, a lubricant, a filler, and the like. It is to be noted that suitable modes of the B1 layer and the B2 layer are similar to the suitable mode of the B layer, except for the average thickness.

D Layer

The D layer is a layer which is directly laminated on the B2 layer and contains the TPU (x). When the multilayer structure of the present invention includes the D layer, there is a tendency for the durability and the flexibility to be improved, whereby the gas barrier properties after flexion can be favorably maintained. Suitable modes of the TPU (x) are similar to the suitable modes of the TPU (b), being the component of the B layer, except for the content. The content of the TPU (x) in the D layer is preferably 70% by mass or more and 99% by mass or less, and more preferably 80% by mass or more and 98% by mass or less.

The D layer preferably contains the EVOH (y). When the D layer contains the EVOH (y), there is a tendency to enable favorably maintaining the gas barrier properties after flexion. Suitable modes of the EVOH (y) are similar to the suitable modes of the EVOH (a1), being the component of the A layer, except for the content. The content of the EVOH (y) in the D layer is preferably 1% by mass or more and 30% by mass or less, and more preferably 2% by mass or more and 20% by mass or less.

The D layer preferably contains a thermoplastic resin (z). When the D layer contains the thermoplastic resin (z), there is a tendency for the solvent resistance and the durability to be favorable. Suitable modes of the thermoplastic resin (z) are similar to the suitable modes of the thermoplastic resin (a2), being the component of the A layer, except for the content. The content of the thermoplastic resin (z) in the D layer is preferably 0.001% by mass or more and 10% by mass or less, more preferably 0.01% by mass or more and 7% by mass or less, and still more preferably 0.03% by mass or more and 4% by mass or less.

In light of a reduction in cost, the D layer is preferably a layer which uses recovered substances from trim, off-spec products, and the like of the multilayer structure of the present invention.

A method of using the recovered product of the trim, the off-spec product, or the like of the multilayer structure of the present invention is exemplified by: a method of pulverizing the trim and/or off-spec product and then inserting the pulverized matter into an extruder and conducting film forming; and a method of carrying out melt kneading using an extruder to produce pellets, and then inserting the pellets back into the extruder to form a film. To control the thickness of the D layer or to dilute the D layer with a novel TPU, a method of carrying out melt kneading to produce pellets, and then inserting the pellets back into the extruder is preferred.

A content ratio x/y of the TPU (x) to the EVOH (y) in the D layer is preferably 70/30 or more, more preferably 75/25 or more, and still more preferably 80/20 or more. On the other hand, the content ratio x/y is preferably 100/0 or less, more preferably 99/1 or less, and still more preferably 98/2 or less. When the content ratio x/y falls within the above range, there is a tendency for sufficient flexibility to be expressed, whereby the gas barrier properties after flexion can be favorably maintained.

A proportion of the D layer accounted for by a total amount of the TPU (x) and the EVOH (y) constituting the D layer is preferably 80% by mass or more, more preferably 85% by mass or more, and still more preferably 90% by mass or more. When the proportion of the D layer accounted for by the total amount of the TPU (x) and the EVOH (y) constituting the D layer is 80% by mass or more, the gas barrier properties after flexion can be maintained, and it becomes easy for sufficient flexibility to be expressed. The proportion of the D layer accounted for by the total amount of the TPU (x) and the EVOH (y) constituting the D layer may be 99% by mass or more.

Intended Usage, Etc.

Due to being superior in terms of the interlayer adhesive force, the gas barrier properties, the external appearance, the flexural resistance, the solvent resistance, and the like, the multilayer structure of the present invention can be used as a food packaging material, a container packaging material for medical treatment, other container packaging materials, a sheet material for industrial use, etc., and as a sheet material for architectural use, a sheet material for agriculture, a geomembrane, a radon barrier film, other sheet materials, as well as various other types of pipes, and the like. In particular, the multilayer structure of the present invention can be suitably used as an inner liner for a tire, an air cushion material for a shoe sole, an inner package of an accumulator, an inflatable ball, an air spring, or the like, as well as a gas barrier film laminated on a filmy rubber product, etc.

Method for Producing Multilayer Structure

A method for producing the multilayer structure of the present invention is not particularly limited as long as the A layer and the B layer can be favorably laminated and adhere to each other, and a well-known method such as coextrusion, pasting, coating, bonding, or attaching may be employed.

The multilayer structure of the present invention may be produced by a method preferably including a step of coextruding the resin for forming the A layer and the resin for forming the B layer. According to such a method, the productivity is superior, superior interlayer adhesive force between the A layer and the B layer is obtained, and the recyclability is also superior.

According to a multilayer coextrusion process, the multilayer structure of the present invention is formed by a process including: heating to melt the resin for forming the A layer and the resin for forming the B layer; feeding the resins with different extruders and/or pumps to extrusion dies through their respective flow paths; extruding the polymers into multiple layers, from the extrusion dies; and thereafter laminating by adhesion. As the extrusion die, for example, a multimanifold die, a field block, a static mixer, or the like may be used.

It is to be noted that the melt viscosity ratio is preferably as specified below in relation to the viscosity of each of the resins for forming the A layer and the B layer. The lower limit of the ratio ($\eta_B/\eta_A$) of the viscosity of the polymer for forming the B layer ($\eta_B$) to the viscosity of the polymer for forming the A layer ($\eta_A$) at a temperature of 210° C. and at a share rate of 1,000/ sec is preferably 0.3, and more preferably 0.5. On the other hand, the upper limit of the melt viscosity ratio ($\eta_B/\eta_A$) is preferably 2, and more preferably 1.5. When the melt viscosity ratio ($\eta_B/\eta_A$) falls with the above range, a favorable external appearance may be provided in forming the multilayer structure of the present invention by multilayer coextrusion, and favorable adhesion between the A layer and the B layer may be provided, whereby the durability and the like of the multilayer structure of the present invention can be improved.

Also in the case of including layer(s) aside from the A layer and the B layer, such as the D layer, the multilayer structure of the present invention may be produced in accordance with the method described above. In other words, each layer may be adhered by a well-known method such as coextrusion, pasting, coating, bonding, or attaching, and of these, producing by coextrusion is preferred.

The method for producing the multilayer structure of the present invention preferably includes a step of irradiating with an electron beam, the structure (multilayer structure) obtained after the coextrusion. Due to the irradiation with an electron beam, a crosslinking reaction occurs between layers, and thus the interlayer adhesive force of the multilayer structure obtained can be enhanced. Various types of electron beam accelerators such as a Cockcroft-Walton accelerator, a Van de Graaff accelerator, a resonance transformer accelerator, an insulated core transformer accelerator, a Dynamitron accelerator, and a high frequency accelerator may be used as an electron beam source.

Molded Product

The molded product according to one embodiment of the present invention includes the multilayer structure of the present invention. In the molded product of the present invention, it is preferable that at least one of the A layer and the B layer contains a colorant. The molded product is exemplified by a container, a pipe, a sheet, a bag, a gas-filled cushioning material, and the like, and the gas-filled cushioning material is preferred. The gas-filled cushioning material is formed by molding the multilayer structure of the present invention into a bag shape having a predetermined shape, and then filling the bag shape with gas. The gas-filled cushioning material is suitably used as, for example, a footwear cushioning material (an air cushioning material for a shoe sole), or the like.

The molded product of the present invention may be constituted from only the multilayer structure of the present invention, or may further include constituent member(s) other than the multilayer structure of the present invention. For example, the molded product may be a product in which a different resin layer or the like is further laminated on the multilayer structure of the present invention, and such a laminate is molded into a predetermined shape.

The colorant contained in the at least one of the A layer and the B layer of the multilayer structure constituting the molded product of the present invention may be either of a pigment and a dye, and may be a white colorant or a black colorant. In the case in which the at least one of the A layer and the B layer contains the colorant, the molded product of the present invention is superior in a design property. The colorant may be contained in only a part of the A layer or the B layer. In other words, the molded product may be a product in which a figure, character(s), and/or the like is/are applied by the colorant. On the other hand, the molded product may be a product in which the colorant is contained in an entirety of the at least one of the A layer and the B layer, and the entire multilayer structure is colored to a predetermined color.

Due to use of the multilayer structure of the present invention, having favorable gas barrier properties and flexural resistance, in a case of the molded product of the present invention being, for example, the cushioning material which is filled with gas, a cushioning property thereof can be exhibited continuously over a long period. Furthermore, since the multilayer structure of the present invention is superior in terms of the solvent resistance, the molded product of the present invention can be used even for an intended usage in which the molded product comes in contact with a solvent, and moreover, exhibits favorable properties even if being a product obtained after a step of being brought into contact with a solvent.

Method for Producing Molded Product

The method for producing a molded product of the present invention is not particularly limited, and preferably includes a step (A) of bringing a multilayer structure into contact with a treatment liquid containing an organic solvent. The treatment liquid preferably contains a colorant. Furthermore, the method for producing a molded product of the present invention may further include a step (B) of molding the multilayer structure. An order of the step (A) and the step (B) is not particularly limited, and carrying out the method in the order of the step (A), and then the step (B) is preferred.

According to the method for producing a molded product of the present invention, when the multilayer structure is brought into contact with the treatment liquid containing the colorant and the organic solvent, at least one of the A layer and the B layer of the multilayer structure is impregnated with the colorant, whereby coloring is applied. The contact between the treatment liquid and the multilayer structure may be carried out by immersing the multilayer structure in the treatment liquid, applying the treatment liquid, printing the treatment liquid, or the like.

The organic solvent contained in the treatment liquid is not particularly limited as long as it is a liquid capable of sufficiently dissolving or dispersing the colorant. Examples of the organic solvent include: alcohols such as methanol and ethanol; esters such as ethyl acetate and butyl acetate; ethers such as diethyl ether and ethylene glycol monobutyl ether; ketones such as acetone and cyclohexanone; aromatic hydrocarbons such as benzene, toluene, xylene, and ethylbenzene; and the like. The treatment liquid may further contain other component(s) such as water, a surfactant, and/or the like.

In the method for producing a molded product of the present invention, the colorant is applied on the multilayer structure using the treatment liquid containing the organic agent; however, superior interlayer adhesiveness is maintained even after the coloring treatment since the multilayer structure is superior in terms of the solvent resistance. In other words, despite the multilayer structure being exposed to the organic solvent during the production process, obtaining a molded product being superior in terms of the delamination resistance is enabled. Furthermore, for example, coloring can be applied on an uncolored multilayer structure in a variety of variations using a plurality of types of the treatment liquid; therefore, superior productivity can be achieved by the method for producing a molded product of the present invention.

As another embodiment, in the method for producing a molded product of the present invention, the treatment liquid used in the step (A) may not contain the colorant. For example, in the step (A), the multilayer structure may be brought into contact with the treatment liquid containing an adhesive agent and the organic solvent, and the multilayer structure may be adhered to the other constituent member. Accordingly, even in the case of using an organic solvent-based adhesive agent, since the multilayer structure of the present invention is superior in terms of the solvent resistance, delamination is unlikely to occur, and favorable adhering and molding are enabled.

EXAMPLES

Hereinafter, the present invention is explained in detail by way of Examples, but the present invention is not in any way limited to these Examples.

Materials Used
EVOH (a1)
  EVOH-1: "EVAL (registered trademark) E105B" (available from Kuraray Co. Ltd.; ethylene-vinyl alcohol copolymer; ethylene unit content: 44 mol %)
  EVOH-2: "EVAL (registered trademark) F101B" (available from Kuraray Co. Ltd.; ethylene-vinyl alcohol copolymer; ethylene unit content: 32 mol %)
  EVOH-3: "EVAL (registered trademark) L171B" (available from Kuraray Co. Ltd.; ethylene-vinyl alcohol copolymer; ethylene unit content: 27 mol %)
  EVOH-4: "EVAL (registered trademark) G156B" (available from Kuraray Co. Ltd.; ethylene-vinyl alcohol copolymer; ethylene unit content: 48 mol %)
Thermoplastic Resin (a2)
  a2-1: "Scona (registered trademark) TPPP2112GA" (available from BYK Chemical Japan KK; maleic anhydride-modified polypropylene (PP); acid value: 21.8 mg KOH/g)
  a2-2: "Modic (registered trademark) P908" (available from Mitsubishi Chemical corporation; maleic anhydride-modified PP; acid value: 16.9 mg KOH/g)
  a2-3: "PRIEX (registered trademark) 25097" (available from Addcomp; maleic anhydride-modified PP; acid value: 12.1 mg KOH/g)
  a2-4: "Admer (registered trademark) QE840" (available from Mitsui Chemicals, Inc.; maleic anhydride-modified PP; acid value: 1.8 mg KOH/g)
  a2-5: "RIKEAID MG440P" (available from Riken Vitamin Co., Ltd.; maleic anhydride-modified PP; acid value: 49.6 mg KOH/g)
  a2-6: "YOUMEX 1010" (available from Sanyo Chemical Industries, Ltd.; maleic anhydride-modified PP; acid value: 81.1 mg KOH/g)
  a2-7: "LOTADER (registered trademark) 3210" (available from Tokyo Zairyo Co., Ltd.; maleic anhydride-modified ethylene-ethylacrylate copolymer; acid value: 17.4 mg KOH/g)
  a2-8: "Admer (registered trademark) PF508" (available from Mitsui Chemicals, Inc.; maleic anhydride-modified PP+maleic anhydride-modified PE (polyethylene); acid value: 6.7 mg KOH/g)
  a2-9: "Tuftec (registered trademark) M1943" (available from Asahi Kasei Chemicals Corporation; maleic anhydride-modified SEBS; acid value: 10.0 mg KOH/g)
TPU (b)
  TPU-1: "Estane (registered trademark) 2103-90AE" (available from Lubrizol Corporation; thermoplastic polyurethane)
Higher Fatty Acid Metal Salt (a3)
  StMg: available from FUJIFILM Wako Pure Chemical Corporation; magnesium stearate
Evaluation Method
(1) Degree of Swelling The resin compositions constituting the A layers and the B layers obtained in the Examples and the Comparative Examples were each subjected to single-layer film forming under the following conditions using a 20 mm extruder manufactured by Toyo Seiki Seisaku-sho, Ltd. (D (mm)=20, L/D=20, compression ratio=2.0, screw: full flight) to give a single-layer film.

Extrusion temperature: resin feeding port/cylinder input port/adapter/die=180/200/200/200° C.
Screw rotation speed: 40 rpm
Discharge rate: 1.3 kg/hr
Temperature of drawing roll: 80° C.
Speed of roll drawing: 1.1 m/min
Film thickness: 60 μm The film obtained was cut to a size of 10 cm×24 cm, and a mass thereof was measured (W0). The cut film was immersed for 30 min, in a solution of 1-propanol/water=60/40 (mass ratio) heated to 40° C., and then a solvent on a surface of the film was wiped away with KIMTOWEL, and the mass was measured (W1). The degree of swelling was calculated from the following formula.

$$S\ [\%\ \text{by mass}] = \{(W1-W0)/W0\} \times 100$$

(2) Solvent Resistance (Delamination Resistance After Immersion in Organic Solvent)

The multilayer structures obtained in the Examples and the Comparative Examples were evaluated on the delamination resistance as described below. Each multilayer structure obtained was cut to a size of 3 cm×3 cm, the cut film was immersed for 30 min, in a solution of 1-propanol/water=60/40 (mass ratio) heated to 40° C., and then a solvent on a surface of the film was wiped away with KIMTOWEL, and the film was left to cool for 2 hrs. The presence of delamination from an end part of the film to a center part of the film was confirmed, length of the delamination was measured in the case of being present, and evaluation on the delamination resistance was conducted based on the following evaluation criteria.

Evaluation: Criteria
  A: No delamination
  B: Less than 1 mm
  C: 1 mm or more and less than 5 mm
  D: 5 mm or more (3) Interlayer Adhesive Force Between A Layer and B Layer The interlayer adhesive force between the A layer and the B layer of the multilayer structure was measured as described below. The multilayer structure obtained was stored in an atmosphere of 23° C. and 50% RH, and then the day after production, a 15 mm strip-shaped slice was made and used as a test material for measurement. Using the test material for measurement, a T type peel strength was measured by using "AGS-H model," an autograph available from Shimadzu Corporation, in an atmosphere of 23° C. and 50% RH, at a strain rate of 250 mm/min. The obtained value (units: g/15 mm) was defined as the interlayer adhesive force between the A layer and the B layer. In accordance with the strength of the interlayer adhesive force, the multilayer structure was evaluated on the interlayer adhesiveness based on the following evaluation criteria.
Evaluation: Criteria
A: 500 g/15 mm or more
B: 400 g/15 mm or more and less than 500 g/15 mm
C: 300 g/15 mm or more and less than 400 g/15 mm
D: Less than 300 g/15 mm (4) External Appearance The multilayer structures obtained in the Examples and the Comparative Examples were visually evaluated on the external appearance based on the following evaluation criteria.
Evaluation: Criteria
A: Favorable appearance with no stripes or streaks
B: Stripes are slightly visible with respect to flowing direction of film
C: Stripes are visible with respect to flowing direction of film
D: Stripes and streaks are visible with respect to flowing direction of film (5) Dispersibility (Measurement of Dispersed Particle Diameter)

The multilayer structures obtained in the Examples and Comparative Examples were cut with a microtome to expose a cross section. The cross section was observed using a scanning electron microscope (SEM), and a dispersed particle diameter of the thermoplastic resin in the A layer was measured. SEM observation was conducted with a backscattered electron detector using SU8010, available from Hitachi High-Technologies Corporation. It is to be noted that with regard to the dispersed particle diameter, 10 randomly selected sites were measured, and an average value was taken.
Evaluation: Criteria
A: Less than 0.3 μm
B: 0.3 μm or more and less than 0.4 μm
C: 0.4 μm or more and less than 0.5 μm (6) Oxygen Transmission Rate (OTR0)

The multilayer structures obtained in the Examples and the Comparative Examples were subjected to humidity conditioning at 20° C. and 65% RH for 5 days, and the oxygen transmission rate was measured with "MOCON OX-TRAN2/20 model," available from Modern Controls Inc., under a condition at 20° C. and 65% RH, in accordance with the method prescribed in JIS K 7126-2 (equal pressure method; 2006), and the average value was determined (unit: mL/(m²·day·atm)). The oxygen transmission rate before subjecting to flexion, described below, was defined as OTR0. It is to be noted that the oxygen transmission rate being 20 mL/(m²·day·atm) or lower suggests the amount of oxygen permeation corresponding to 20 mL or less per m² per day under a condition of 1 atmospheric pressure; therefore, the evaluation may be made as having the gas barrier properties.
Evaluation: Criteria
A: 5.0 mL/m²·day·atm≥OTR0
B: 5.0 mL/m²·day·atm<OTR0≤10.0 mL/m²·day·atm
C: 10.0 mL/m²·day·atm<OTR0≤20.0 mL/m²·day·atm
D: 20 mL/m²·day·atm<OTR0

(7) Flexural Resistance (Gas Barrier Properties Before and After Flexion (OTR0/ OTR50))

With regard to the multilayer structures obtained in the Examples and the Comparative Examples, flexion was repeated 50 times in an environment at 23° C. using "BE1006," a thermostat-attached Gelvo-type flex tester manufactured by Tester Sangyo Co., Ltd., in accordance with ASTM-F392-74. The multilayer structures before and after flexion were evaluated on the gas barrier properties.

The oxygen transmission rate before subjecting to flexion was defined as OTR0 and the oxygen transmission rate after flexion was defined as OTR50, and OTR0/ OTR50 was evaluated in accordance with the following evaluation criteria.
Evaluation: Criteria
A: OTR0/ OTR50≥0.9
B: 0.9>OTR0/ OTR50≥0.8
C: 0.8>OTR0/ OTR50≥0.7
D: 0.7>OTR0/ OTR50

(8) Recycling Test (Torque Behavior)

60 g of the multilayer structure obtained in each of the Examples and Comparative Examples was cut (about 1 cm×1 cm) to conform to an input port of a Laboplast Mill ("20R200," twin screw counter rotating type, manufactured by Toyo Seiki Seisaku-sho, Ltd.), and kneaded at 60 rpm at 200° C. Torque at 5 min after the start of kneading was defined as T5, torque at 60 min after the start of kneading was defined as T60, and the multilayer structure was evaluated on T60/ T5 in accordance with the following evaluation criteria. T60/ T5 being smaller indicates a low change in viscosity, superior long-run workability, and ease of recycling.
Evaluation: Criteria
A: 1.1≥T60/ T5
B: 1.5≥T60/ T5>1.1
C: 2.0≥T60/ T5>1.5
D: T60/ T5>2.0

Example 1

With 90 parts by mass of EVAL (registered trademark) E105B (EVOH-1) was dry blended 10 parts by mass of Scona TPPP2112GA (a2-1), and melt pelletization was performed at a screw rotation speed of 100 rpm and a discharge rate of 6.5 kg/hr using a two-screw extruder manufactured by Toyo Seiki Seisaku-sho, Ltd. (inlet diameter 25 mm, L/D=25) to produce an EVOH composition. The EVOH composition thus obtained and Estane 2103-90AE (TPU-1) were used as materials, which were fed in a molten state at 190° C. into a coextruder having a 19-layer feedblock and coextruded, whereby a multilayer structure was produced having a total of 19 layers, with 9 layers of the EVOH layer (A layer) and 10 layers of the TPU layer (B layer) being alternately laminated.

The multilayer structure obtained as described above was observed in cross section with "DIGITAL MICROSCOPE VK-X200," manufactured by Keyence Corporation. As a result, the A layer (gas barrier layer) had an average thickness per layer of 1.1 μm; and the B layer (TPU layer) had an average thickness per layer of 3.3 μm. It is to be noted that each thickness was an average value of measurements at 10 sites being selected randomly.

The multilayer structure thus obtained was evaluated in accordance with (1) to (8) above. The evaluation results are shown in Table 1. It is to be noted that in the multilayer structure thus obtained, the interlayer adhesive force was 730 g/15 mm; the dispersed particle diameter of the thermoplastic resin (a2) was 0.23 μm; the OTR0 was 3.0 mL/(m²·day·atm), and the OTR50 was 3.2 mL/ (m²·day·atm); OTR0/ OTR50 was 0.94; and in the recycling test, T5 was 6.72 N·m, T60 was 6.82 N·m, and T60/ T5 was 1.0.

Furthermore, the multilayer structure obtained in Example 1 was embedded with an epoxy resin, and a slice in a transverse direction was produced using an ultramicrotome. The transverse slice thus obtained was subjected to gas-phase staining for 5 days with solid osmium oxide, and then observation at a magnification of 5,000 times was conducted using "JEM2100," a transmission electron microscope (TEM) available from JEOL, Ltd. A TEM image of a cross section of the A layer thus observed is shown in FIG. 1. The EVOH (a1) was stained gray or black, and it was confirmed that the EVOH (a1) was dispersed in the dispersed particles of the thermoplastic resin (a2) in a scattering manner. With regard to a dispersed particle diameter of the EVOH (a1) in the dispersed particles of the thermoplastic resin (a2), an average value of measurement values of 10 sites being randomly selected was 0.05 µm.

Examples 2 to 30 and Comparative Examples 1 to 4

Evaluations were conducted using the multilayer structures in a similar manner to Example 1, except that changes were made as shown in Tables 1 to 3. The evaluation results are shown in Tables 1 to 3. It is to be noted that in Tables 1 to 3, an MFR (melt flow rate) of each thermoplastic resin (a2) used is also shown.

TABLE 1

| | | | | Example 1 | Example 2 | Example 3 | Example 4 | Example 5 | Example 6 |
|---|---|---|---|---|---|---|---|---|---|
| A layer | EVOH (a1) | type | | EVOH-1 | EVOH-1 | EVOH-1 | EVOH-1 | EVOH-1 | EVOH-1 |
| | | amount added | parts by mass | 90 | 98.5 | 99.2 | 99.7 | 83 | 77 |
| | Thermoplastic resin (a2) | type | | a2-1 | a2-1 | a2-1 | a2-1 | a2-1 | a2-1 |
| | | acid value | mg-KOH/g | 21.8 | 21.8 | 21.8 | 21.8 | 21.8 | 21.8 |
| | | MFR | g/10 min | 4.6 | 4.6 | 4.6 | 4.6 | 4.6 | 4.6 |
| | | amount added | parts by mass | 10 | 1.5 | 0.8 | 0.3 | 17 | 23 |
| | Metal salt | metal salt type | — | — | — | — | — | — | — |
| | | Mg | ppm | — | — | — | — | — | — |
| | Degree of swelling | % by mass | | 25.8 | 29.5 | 35.2 | 48.2 | 23.2 | 21.5 |
| | No. of layers | — | | 9 | 9 | 9 | 9 | 9 | 9 |
| | Average thickness | Mm | | 1.1 | 1.1 | 1.1 | 1.1 | 1.1 | 1.1 |
| B layer | TPU (b) | type | | TPU-1 | TPU-1 | TPU-1 | TPU-1 | TPU-1 | TPU-1 |
| | Degree of swelling | % by mass | | 16.6 | 16.6 | 16.6 | 16.6 | 16.6 | 16.6 |
| | No. of layers | — | | 10 | 10 | 10 | 10 | 10 | 10 |
| | Average thickness | Mm | | 3.3 | 3.3 | 3.3 | 3.3 | 3.3 | 3.3 |
| Thickness ratio | A/B | | | 0.33 | 0.33 | 0.33 | 0.33 | 0.33 | 0.33 |
| Evaluation | Solvent resistance (delamination resistance) | | | A | A | B | C | A | A |
| | Interlayer adhesive force | | | A | A | A | A | A | B |
| | Appearance | | | A | A | A | A | A | A |
| | Dispersibility | | | A | A | A | A | A | A |
| | Oxygen transmission rate (OTR0) | | | A | A | A | A | A | B |
| | Flexural resistance (OTR0/OTR50) | | | A | A | A | A | A | A |
| | Recycling test (torque behavior) | | | A | A | A | A | A | B |

| | | | | Example 7 | Example 8 | Example 9 | Comparative Example 1 | Comparative Example 2 |
|---|---|---|---|---|---|---|---|---|
| A layer | EVOH (a1) | type | | EVOH-1 | EVOH-1 | EVOH-1 | EVOH-1 | EVOH-1 |
| | | amount added | parts by mass | 72 | 72 | 72 | 100 | 62 |
| | Thermoplastic resin (a2) | type | | a2-1 | a2-1 | a2-1 | — | a2-1 |
| | | acid value | mg-KOH/g | 21.8 | 21.8 | 21.8 | — | 21.8 |
| | | MFR | g/10 min | 4.6 | 4.6 | 4.6 | — | 4.6 |
| | | amount added | parts by mass | 28 | 28 | 28 | — | 38 |
| | Metal salt | metal salt type | — | — | StMg | StMg | — | — |
| | | Mg | ppm | — | 70 | 150 | — | — |
| | Degree of swelling | % by mass | | 19.8 | 19.8 | 19.8 | 56.5 | 19.8 |
| | No. of layers | — | | 9 | 9 | 9 | 9 | 9 |
| | Average thickness | Mm | | 1.1 | 1.1 | 1.1 | 1.1 | 1.1 |
| B layer | TPU (b) | type | | TPU-1 | TPU-1 | TPU-1 | TPU-1 | TPU-1 |
| | Degree of swelling | % by mass | | 16.6 | 16.6 | 16.6 | 16.6 | 16.6 |
| | No. of layers | — | | 10 | 10 | 10 | 10 | 10 |
| | Average thickness | Mm | | 3.3 | 3.3 | 3.3 | 3.3 | 3.3 |
| Thickness ratio | A/B | | | 0.33 | 0.33 | 0.33 | 0.33 | 0.33 |
| Evaluation | Solvent resistance (delamination resistance) | | | A | A | A | D | A |
| | Interlayer adhesive force | | | C | B | A | A | D |
| | Appearance | | | B | B | B | A | C |

TABLE 1-continued

| | | | | | |
|---|---|---|---|---|---|
| Dispersibility | A | A | A | — | A |
| Oxygen transmission rate (OTR0) | C | C | C | A | D |
| Flexural resistance (OTR0/OTR50) | A | A | A | A | A |
| Recycling test (torque behavior) | C | B | B | A | D |

TABLE 2

| | | | | Example 10 | Example 11 | Example 12 | Example 13 | Example 14 | Example 15 |
|---|---|---|---|---|---|---|---|---|---|
| A layer | EVOH (a1) | type | | EVOH-1 | EVOH-1 | EVOH-1 | EVOH-1 | EVOH-1 | EVOH-1 |
| | | amount added | parts by mass | 90 | 90 | 90 | 90 | 90 | 90 |
| | Thermoplastic resin (a2) | type | | a2-2 | a2-3 | a2-4 | a2-5 | a2-6 | a2-7 |
| | | acid value | mg-KOH/g | 16.9 | 12.1 | 1.8 | 49.6 | 81.1 | 17.4 |
| | | MFR | g/10 min | 91.4 | 521.2 | 4.6 | 849.3 | 1004.2 | 5.0 |
| | | amount added | parts by mass | 10 | 10 | 10 | 10 | 10 | 10 |
| | Metal salt | metal salt type | — | — | — | — | — | — | — |
| | | Mg | ppm | — | — | — | — | — | — |
| | Degree of swelling | % by mass | | 26.8 | 37.2 | 41.2 | 27.2 | 28.3 | — |
| | No. of layers | — | | 9 | 9 | 9 | 9 | 9 | 9 |
| | Average thickness | Mm | | 1.1 | 1.1 | 1.1 | 1.1 | 1.1 | 1.1 |
| B layer | TPU (b) | type | | TPU-1 | TPU-1 | TPU-1 | TPU-1 | TPU-1 | TPU-1 |
| | Degree of swelling | % by mass | | 16.6 | 16.6 | 16.6 | 16.6 | 16.6 | 16.6 |
| | No. of layers | — | | 10 | 10 | 10 | 10 | 10 | 10 |
| | Average thickness | Mm | | 3.3 | 3.3 | 3.3 | 3.3 | 3.3 | 3.3 |
| Thickness ratio | | A/B | | 0.33 | 0.33 | 0.33 | 0.33 | 0.33 | 0.33 |
| Evaluation | Solvent resistance (delamination resistance) | | | A | B | C | A | A | B |
| | Interlayer adhesive force | | | A | A | A | B | C | B |
| | Appearance | | | A | A | A | A | A | A |
| | Dispersibility | | | A | A | A | B | C | A |
| | Oxygen transmission rate (OTR0) | | | A | A | A | B | C | A |
| | Flexural resistance (OTR0/OTR50) | | | A | A | A | A | A | A |
| | Recycling test (torque behavior) | | | A | A | A | B | C | C |

| | | | | Example 16 | Example 17 | Example 18 | Example 19 | Example 20 |
|---|---|---|---|---|---|---|---|---|
| A layer | EVOH (a1) | type | | EVOH-1 | EVOH-1 | EVOH-2 | EVOH-3 | EVOH-4 |
| | | amount added | parts by mass | 90 | 90 | 99.2 | 99.2 | 99.2 |
| | Thermoplastic resin (a2) | type | | a2-8 | a2-9 | a2-1 | a2-1 | a2-1 |
| | | acid value | mg-KOH/g | 6.7 | 10.0 | 21.8 | 21.8 | 21.8 |
| | | MFR | g/10 min | 2.7 | 1.0 | 4.6 | 4.6 | 4.6 |
| | | amount added | parts by mass | 10 | 10 | 0.8 | 0.8 | 0.8 |
| | Metal salt | metal salt type | — | — | — | — | — | — |
| | | Mg | ppm | — | — | — | — | — |
| | Degree of swelling | % by mass | | 43.8 | 47.2 | 39.2 | 45.7 | 31.2 |
| | No. of layers | — | | 9 | 9 | 9 | 9 | 9 |
| | Average thickness | Mm | | 1.1 | 1.1 | 1.1 | 1.1 | 1.1 |
| B layer | TPU (b) | type | | TPU-1 | TPU-1 | TPU-1 | TPU-1 | TPU-1 |
| | Degree of swelling | % by mass | | 16.6 | 16.6 | 16.6 | 16.6 | 16.6 |
| | No. of layers | — | | 10 | 10 | 10 | 10 | 10 |
| | Average thickness | Mm | | 3.3 | 3.3 | 3.3 | 3.3 | 3.3 |
| Thickness ratio | | A/B | | 0.33 | 0.33 | 0.33 | 0.33 | 0.33 |
| Evaluation | Solvent resistance (delamination resistance) | | | A | B | B | C | B |
| | Interlayer adhesive force | | | A | A | A | A | A |
| | Appearance | | | A | A | A | A | A |
| | Dispersibility | | | B | B | A | A | A |
| | Oxygen transmission rate (OTR0) | | | B | B | A | A | A |
| | Flexural resistance (OTR0/OTR50) | | | A | A | A | A | A |
| | Recycling test (torque behavior) | | | A | B | A | A | A |

TABLE 3

| | | | | Example 21 | Example 22 | Example 23 | Example 24 | Example 25 | Example 26 | Example 27 |
|---|---|---|---|---|---|---|---|---|---|---|
| A layer | EVOH (a1) | type | | EVOH-1 | EVOH-1 | EVOH-1 | EVOH-1 | EVOH-1 | EVOH-1 | EVOH-1 |
| | | amount added | parts by mass | 99.2 | 99.2 | 99.2 | 99.2 | 99.2 | 99.2 | 99.2 |
| | Thermoplastic resin (a2) | type | | a2-1 | a2-1 | a2-1 | a2-1 | a2-1 | a2-1 | a2-1 |
| | | acid value | mg-KOH/g | 21.8 | 21.8 | 21.8 | 21.8 | 21.8 | 21.8 | 21.8 |
| | | MFR | g/10 min | 4.6 | 4.6 | 4.6 | 4.6 | 4.6 | 4.6 | 4.6 |
| | | amount added | parts by mass | 0.8 | 0.8 | 0.8 | 0.8 | 0.8 | 0.8 | 0.8 |
| | Metal salt | metal salt type | — | — | — | — | — | — | — | — |
| | | Mg | ppm | — | — | — | — | — | — | — |
| | Degree of swelling | % by mass | | 35.2 | 35.2 | 35.2 | 35.2 | 35.2 | 35.2 | 35.2 |
| | No. of layers | — | | 9 | 9 | 9 | 9 | 9 | 9 | 9 |
| | Average thickness | Mm | | 1.1 | 2.8 | 5.3 | 3.2 | 4.1 | 0.6 | 0.3 |
| B layer | TPU (b) | type | | TPU-1 | TPU-1 | TPU-1 | TPU-1 | TPU-1 | TPU-1 | TPU-1 |
| | Degree of swelling | % by mass | | 16.6 | 16.6 | 16.6 | 16.6 | 16.6 | 16.6 | 16.6 |
| | No. of layers | — | | 10 | 10 | 10 | 10 | 10 | 10 | 10 |
| | Average thickness | Mm | | 5.2 | 8.2 | 11.2 | 2.9 | 9.2 | 3.1 | 3.4 |
| Thickness ratio | | A/B | | 0.21 | 0.34 | 0.47 | 1.10 | 0.45 | 0.19 | 0.09 |
| Evaluation | Solvent resistance (delamination resistance) | | | C | C | C | C | C | C | C |
| | Interlayer adhesive force | | | A | A | A | A | A | A | A |
| | External appearance | | | A | A | A | A | A | A | A |
| | Dispersibility | | | A | A | A | A | A | A | A |
| | Oxygen transmission rate (OTR0) | | | A | A | A | A | A | B | C |
| | Flexural resistance (OTR0/OTR50) | | | A | B | C | C | B | B | C |
| | Recycling test (torque behavior) | | | B | B | C | C | C | B | B |

| | | | | Example 28 | Example 29 | Example 30 | Comparative Example 3 | Comparative Example 4 |
|---|---|---|---|---|---|---|---|---|
| A layer | EVOH (a1) | type | | EVOH-1 | EVOH-1 | EVOH-1 | EVOH-1 | EVOH-1 |
| | | amount added | parts by mass | 99.2 | 99.2 | 99.2 | 99.2 | 100 |
| | Thermoplastic resin (a2) | type | | a2-1 | a2-1 | a2-1 | a2-1 | — |
| | | acid value | mg-KOH/g | 21.8 | 21.8 | 21.8 | 21.8 | — |
| | | MFR | g/10 min | 4.6 | 4.6 | 4.6 | 4.6 | — |
| | | amount added | parts by mass | 0.8 | 0.8 | 0.8 | 0.8 | — |
| | Metal salt | metal salt type | — | — | — | — | — | — |
| | | Mg | ppm | — | — | — | — | — |
| | Degree of swelling | % by mass | | 35.2 | 35.2 | 35.2 | 35.2 | 56.5 |
| | No. of layers | — | | 9 | 18 | 36 | 1 | 1 |
| | Average thickness | Mm | | 0.3 | 2.8 | 2.8 | 2.8 | 2.8 |
| B layer | TPU (b) | type | | TPU-1 | TPU-1 | TPU-1 | TPU-1 | TPU-1 |
| | Degree of swelling | % by mass | | 16.6 | 16.6 | 16.6 | 16.6 | 16.6 |
| | No. of layers | — | | 10 | 19 | 37 | 2 | 2 |
| | Average thickness | Mm | | 0.6 | 8.2 | 8.2 | 8.2 | 8.2 |
| Thickness ratio | | A/B | | 0.50 | 0.34 | 0.34 | 0.34 | 0.34 |
| Evaluation | Solvent resistance (delamination resistance) | | | C | B | B | B | C |
| | Interlayer adhesive force | | | A | A | A | A | A |
| | External appearance | | | A | A | A | A | A |
| | Dispersibility | | | A | A | A | A | — |
| | Oxygen transmission rate (OTR0) | | | C | A | A | C | C |
| | Flexural resistance (OTR0/OTR50) | | | C | A | A | D | D |
| | Recycling test (torque behavior) | | | B | A | A | A | A |

As shown in Tables 1 to 3, with regard to Examples 1 to 30, the solvent resistance (the delamination resistance after immersion in the organic solvent), the gas barrier properties, and the flexural resistance were favorable. Furthermore, with regard to Examples 1 to 30, it can be seen that the interlayer adhesive force, external appearance, dispersibility, and recyclability were also favorable. Moreover, comparing Examples 7 to 9, which are the same except for the presence of the metal salt, it can be seen that adding the metal salt to the A layer results in enhancing the interlayer adhesive force, the recyclability, and the like.

On the other hand, the results were such that Comparative Example 1, which did not include the thermoplastic resin (a2) in the A layer, had poor solvent resistance; and Comparative Example 2, which had an excessive content of the thermoplastic resin (a2) in the A layer, had poor gas barrier properties, interlayer adhesive force, and recyclability. Furthermore, in Comparative Example 3, which had a low sum of the numbers of the A layer and the B layer, had a result of the solvent resistance being sufficient, but the flexural resistance being poor. Moreover, comparing Comparative Example 1 (19 layers) to Comparative Example 4 (3 layers), which differed only in terms of the number of layers, the solvent resistance of Comparative Example 1 was evaluated to be D, while in contrast, the solvent resistance of Comparative Example 4 was evaluated to be C. More specifically, it can be seen that the delamination after immersion in the organic solvent is a phenomenon occurring significantly in the case of the number of layers being high.

Example 31

The laminate was produced by a similar operation to that of Example 1, except for adjustments such that an average thickness of a layer corresponding to the polyurethane layer (B1) was 3.3 μm, and an average thickness of a layer corresponding to the polyurethane layer (B2) was 20 μm. The interlayer adhesive force of the laminate thus obtained was 750 g/15 mm; the dispersed particle diameter of the thermoplastic resin (a2) was 0.23 μm; the OTR0 was 3.0 mL/(m$^2$·day·atm), and the OTR50 was 3.1 mL/(m$^2$·day·atm); OTR0/ OTR50 was 0.97; and in the recycling test, T5 was 10.51 N·m, T60 was 10.75 N·m, and T60/ T5 was 1.02. Furthermore, the laminate was evaluated on the solvent resistance, the external appearance, and the dispersibility similarly to Example 1, and was evaluated to be A in each of these.

Example 32

As a protective layer (D) directly laminated to an outer side of the polyurethane layer (B2) of Example 31, a resin composition in which a ratio of TPU-1 to the EVOH composition produced in Example 1 was 95:5 was used, 2 layers of the protective layer (D) were provided through coextrusion, and a laminate was produced and evaluated similarly to Example 31, except that the laminate was produced to have a sum of 21 layers. The average thickness per layer of the protective layer (D) was 500 μm. The interlayer adhesive force of the laminate thus obtained was 780 g/15 mm; the dispersed particle diameter of the thermoplastic resin (a2) was 0.25 μm; the OTR0 was 3.0 mL/(m$^2$·day·atm), and the OTR50 was 3.1 mL/(m$^2$·day·atm); OTR0/ OTR50 was 0.97; and in the recycling test, T5 was 18.75 N·m, T60 was 18.21 N·m, and T60/ T5 was 0.97. Furthermore, the laminate was evaluated on the solvent resistance, the external appearance, and the dispersibility similarly to Example 1, and was evaluated to be A in each of these.

INDUSTRIAL APPLICABILITY

As, e.g., a material which is required to have gas barrier properties, durability, elasticity, and the like, the multilayer structure of the present invention can be used as a food packaging material, a container packaging material for medical treatment, other container packaging materials, a sheet material for industrial use, etc., and as a sheet material for architectural use, a sheet material for agriculture, a geomembrane, a radon barrier film, other sheet materials, as well as various other types of pipes, and the like. In particular, the multilayer structure of the present invention can be suitably used as a material such as an inner liner for a tire, an air cushion material for a shoe sole, an inner package of an accumulator, an inflatable ball, an air spring, or the like, as well as a gas barrier film laminated on a filmy rubber product, etc.

The invention claimed is:

1. A multilayer structure comprising:
   a gas barrier layer (A) which comprises an ethylene-vinyl alcohol copolymer (a1) and a thermoplastic resin (a2) having a functional group capable of reacting with the ethylene-vinyl alcohol copolymer (a1); and
   a polyurethane layer (B) which comprises a thermoplastic polyurethane (b),
   wherein
   an acid value of the thermoplastic resin (a2) is from 0.5 to 50 mg KOH/g,
   a content of the thermoplastic resin (a2) with respect to 100 parts by mass in total of the ethylene-vinyl alcohol copolymer (a1) and the thermoplastic resin (a2) is 0.1 to 30 parts by mass,
   the multilayer structure comprises a constitution comprising at least one set of the gas barrier layer (A) and the polyurethane layer (B) being directly laminated to each other, and
   a sum of numbers of the gas barrier layer (A) and the polyurethane layer (B) is 9 or more and 300 or less.

2. The multilayer structure according to claim 1, wherein the functional group comprised in the thermoplastic resin (a2) is a carboxy group or a derivative thereof.

3. The multilayer structure according to claim 1, wherein the thermoplastic resin (a2) is at least one selected from the group consisting of modified polyethylene, modified polypropylene, a modified ethylene-vinyl acetate copolymer, and a modified ethylene-ethyl acrylate copolymer.

4. The multilayer structure according to claim 1, wherein a content of an ethylene unit of the ethylene-vinyl alcohol copolymer (a1) is 20 mol % or more and 60 mol % or less.

5. The multilayer structure according to claim 1, wherein the gas barrier layer (A) further comprises a higher fatty acid metal salt (a3).

6. The multilayer structure according to claim 1, wherein the gas barrier layer (A) and the polyurethane layer (B) are alternately laminated.

7. The multilayer structure according to claim 6, wherein the polyurethane layer (B) comprises: a polyurethane layer (B1) on which the gas barrier layer (A) is directly laminated on both faces; and a polyurethane layer (B2) on which the gas barrier layer (A) is directly laminated on only one face.

8. The multilayer structure according to claim 7, comprising a protective layer (D) being directly laminated on the polyurethane layer (B2), wherein the protective layer (D) comprises a thermoplastic polyurethane (x).

9. The multilayer structure according to claim 8, wherein the protective layer (D) comprises an ethylene-vinyl alcohol copolymer (y).

10. The multilayer structure according to claim 8, wherein an average thickness per layer of the protective layer (D) is 300 μm or more and 800 μm or less.

11. The multilayer structure according to claim 1, wherein an average thickness per layer of the gas barrier layer (A) is 0.1 μm or more and 15 μm or less.

12. The multilayer structure according to claim 1, wherein an average thickness per layer of the polyurethane layer (B) is 0.1 μm or more and 30 μm or less.

13. The multilayer structure according to claim 1, wherein the gas barrier layer (A) forms a phase separation structure comprising a sea phase and an island phase, wherein the sea phase comprises the ethylene-vinyl alcohol copolymer (a1), and the island phase comprises the thermoplastic resin (a2).

14. The multilayer structure according to claim 13, wherein an interior of the island phase further comprises a phase comprising the ethylene-vinyl alcohol copolymer (a1).

15. A molded product which comprises the multilayer structure according to claim 1, wherein at least one of the gas barrier layer (A) and the polyurethane layer (B) comprises a colorant.

16. A method for producing a molded product, the method comprising bringing the multilayer structure according to claim 1 into contact with a treatment liquid comprising an organic solvent.

17. The method for producing a molded product according to claim 16, wherein the treatment liquid comprises a colorant.

18. The multilayer structure according to claim 1, wherein the acid value of the thermoplastic resin (a2) is from 15 to 40 mg KOH/g.

19. The multilayer structure according to claim 5, wherein a content of the higher fatty acid metal salt (a3) is from 10 to 300 ppm and/or wherein the higher fatty acid metal salt (a3) comprises at least one metal atom selected from the group consisting of magnesium, manganese, tin, cobalt, zinc, cadmium, lead, and titanium.

20. A multilayer structure comprising:
   a gas barrier layer (A) which comprises an ethylene-vinyl alcohol copolymer (a1) and a thermoplastic resin (a2) having a functional group capable of reacting with the ethylene-vinyl alcohol copolymer (a1); and
   a polyurethane layer (B) which comprises a thermoplastic polyurethane (b),
   wherein
   a content of the thermoplastic resin (a2) with respect to 100 parts by mass in total of the ethylene-vinyl alcohol copolymer (a1) and the thermoplastic resin (a2) is 0.1 to 30 parts by mass,
   the multilayer structure comprises a constitution comprising at least one set of the gas barrier layer (A) and the polyurethane layer (B) being directly laminated to each other,
   a sum of numbers of the gas barrier layer (A) and the polyurethane layer (B) is 9 or more and 300 or less, and
   the gas barrier layer (A) forms a phase separation structure comprising a sea phase and an island phase, wherein the sea phase comprises the ethylene-vinyl alcohol copolymer (a1), and the island phase comprises the thermoplastic resin (a2).

21. The multilayer structure according to claim 20, wherein an interior of the island phase further comprises a phase comprising the ethylene-vinyl alcohol copolymer (a1).

* * * * *